(12) United States Patent
Shioji

(10) Patent No.: US 8,319,849 B2
(45) Date of Patent: Nov. 27, 2012

(54) IMAGE CAPTURE DEVICE THAT CAN PLAYBACK AND OUTPUT A SELECTED FILE FROM AN EXTERNAL STORAGE DEVICE

(75) Inventor: Masahiro Shioji, Neyagawa (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 260 days.

(21) Appl. No.: 12/593,451

(22) PCT Filed: Mar. 25, 2008

(86) PCT No.: PCT/JP2008/055529
§ 371 (c)(1),
(2), (4) Date: Sep. 28, 2009

(87) PCT Pub. No.: WO2008/117791
PCT Pub. Date: Oct. 2, 2008

(65) Prior Publication Data
US 2010/0073509 A1    Mar. 25, 2010

(30) Foreign Application Priority Data

Mar. 27, 2007 (JP) ................................. 2007-082692
Aug. 8, 2007 (JP) ................................. 2007-206521
Sep. 3, 2007 (JP) ................................. 2007-227898

(51) Int. Cl.
H04N 5/228 (2006.01)
H04N 5/76 (2006.01)
(52) U.S. Cl. ............. 348/222.1; 348/231.99; 348/231.1; 348/231.2; 348/231.3; 348/231.5; 348/231.6; 348/231.8; 348/231.9
(58) Field of Classification Search ............... 348/222.1, 348/231.99, 231.1, 231.2, 231.3, 231.5, 231.6, 348/231.8, 231.9; 386/46
See application file for complete search history.

(56) References Cited

U.S. PATENT DOCUMENTS
6,549,958 B1    4/2003 Kuba
(Continued)

FOREIGN PATENT DOCUMENTS
EP    1 744 554 A1    1/2007
(Continued)

OTHER PUBLICATIONS

European Search Report dated Oct. 1, 2010, issued in corresponding European Patent Application No. 10007850.0.
(Continued)

Primary Examiner — Usman Khan
Assistant Examiner — Quang Le
(74) Attorney, Agent, or Firm — Westerman, Hattori, Daniels & Adrian, LLP

(57) ABSTRACT

An image capture device is provided that can playback and output a desirable file of multiple files accumulated in an external storage device. The image capture device of the present invention has a camera body including: a memory controller for writing an image file obtained by image shooting to an external memory card, or for reading a file from the external memory card; a USB interface for making connection to an external hard disk drive; a USB host controller for controlling transmission and receipt of data through the interface; and a CPU for controlling the operations of the memory controller and the USB host controller in order to transmit data between the external memory card and the external hard disk drive.

8 Claims, 24 Drawing Sheets

U.S. PATENT DOCUMENTS

| | | | |
|---|---|---|---|
| 6,833,848 | B1 | 12/2004 | Wolff et al. |
| 6,992,710 | B2 * | 1/2006 | Nagaoka ................... 348/231.2 |
| 7,840,892 | B2 * | 11/2010 | Pyhalammi et al. .......... 715/230 |
| 7,907,186 | B2 * | 3/2011 | Um et al. ................... 348/231.2 |
| 8,106,856 | B2 | 1/2012 | Matas et al. |
| 2002/0052886 | A1 | 5/2002 | Nagaoka |
| 2002/0186958 | A1 | 12/2002 | Ikeda et al. |
| 2003/0031457 | A1 | 2/2003 | Miomo et al. |
| 2003/0074373 | A1 | 4/2003 | Kaburagi et al. |
| 2003/0182297 | A1 | 9/2003 | Murakami et al. |
| 2004/0167783 | A1 | 8/2004 | Nagai |
| 2004/0213092 | A1 | 10/2004 | Ueda et al. |
| 2005/0015410 | A1 | 1/2005 | Sato |
| 2006/0209214 | A1 | 9/2006 | Fader et al. |
| 2006/0290788 | A1 | 12/2006 | Ohtsuka et al. |
| 2007/0250541 | A1 | 10/2007 | Takeda |

FOREIGN PATENT DOCUMENTS

| | | |
|---|---|---|
| JP | 05-091452 A | 4/1993 |
| JP | 05-167979 A | 7/1993 |
| JP | 07-200635 A | 8/1995 |
| JP | 2002-140219 A | 5/2002 |
| JP | 2002-252798 A | 9/2002 |
| JP | 2002-0359763 A | 12/2002 |
| JP | 2003-91441 A | 3/2003 |
| JP | 2003-091441 A | 3/2003 |
| JP | 2003-114820 A | 4/2003 |
| JP | 2004-229328 A | 8/2004 |
| JP | 2005-149170 A | 6/2005 |
| JP | 2006-246120 A | 9/2006 |
| WO | 2005/010468 A2 | 2/2005 |

OTHER PUBLICATIONS

Japanese Office Action dated Jun. 8, 2010, issued in corresponding Japanese Patent Application No. 2007-228401.

European Search Report dated Mar. 8, 2010, issued in corresponding European Patent Application No. 08738824.5.

European Search Report dated Mar. 24, 2010, issued in family-related corresponding European Patent Application No. 08738825.2.

Related U.S. Appl. No. 12/593,493, filed Sep. 28, 2009, entitled Image Processing Device.

International Search Report for PCT/JP2008/055529, mailing date of Jun. 3, 2008.

Japanese Office Action dated Oct. 25, 2011, issued in corresponding Japanese Patent Application 2007-227898.

US Office action dated Oct. 19, 2011 issued in related U.S. Appl. No. 12/593,473.

European Office Action dated Jan. 26, 2011, issued in corresponding European Patent Application No. 08738824.5.

European Office Action dated Jul. 15, 2011, issued in corresponding European Patent Application No. 08738824.5.

European Office Action dated Feb. 14, 2011, issued in related European Patent Application No. 08738825.2.

Chinese Office Action dated Aug. 8, 2011, issued in corresponding Chinese Patent Application No. 200880009558.9.

Fujitsu Siemens Computers, "Pocket LOOX 718. Pocket LOOX 720. The Ultimate Pocket PC" Web URL: http://uk.ts.fujitsu.com/rl/servicesupport/techsupport/pda/LOOX-700-Series/Docs/ds__pocket_loox_700.pdf, Jul. 2005, cited in European Office Action mailed Jan. 26, 2011, 2 pages. (cited in European Office Action dated Jan. 26, 2011 and European Office Action dated Feb. 14, 2012).

Japanese Office Action dated Jun. 26, 2012, issued in corresponding Japanese Patent Application No. 2007-227898, (6 pages). With English Translation.

US Office Action dated Aug. 16, 2012, issued in related U.S. Appl. No. 12/593,473, (25 pages).

* cited by examiner

IMAGE CAPTURE DEVICE THAT CAN PLAYBACK AND OUTPUT A SELECTED FILE FROM AN EXTERNAL STORAGE DEVICE

TECHNICAL FIELD

The present invention relates to an image capture device such as a digital camera, and an image capture system formed by connecting an external storage device to the image capture device.

BACKGROUND ART

A conventionally used digital camera can shoot still images and moving images, and can record sounds during shooting. Image data obtained by shooting can be written into an external memory (see for example Japanese Patent Application Laid-Open Nos. 5-91452 and 2002-359763).

In an exemplary digital camera shown in FIG. 28, a camera body 41 includes: an optical shooting system 42 with a lens, a CCD and the like; a camera signal processing circuit 43 for performing necessary processing upon a signal given from the optical image shooting system 42; an encoder 44 for encoding an image signal obtained from the camera signal processing circuit 43 by using JPEG or the like; an attachable/detachable memory card 47 into which an image signal obtained from the encoder 44 is to be written; a decoder 45 for decoding an image signal read from the memory card 47 by using JPEG or the like; a video output circuit 46 for outputting an image signal obtained from the decoder 45 to a display 49; and an interface 48 for making connection to a storage device 51.

The storage device 51 includes: a card drive 52 for reading a signal from the memory card 47; an interface 53 to be connected to the interface 48 of the camera body 41; a storage medium 54 such as a hard disk or the like into which a signal obtained from the card drive 52 or from the interface 53 is recorded; a decoder 55 for decoding an image signal read from the storage medium 54 by using JPEG or the like; and a video output circuit 56 for outputting an image signal obtained from the decoder 55 to a display 57.

In the digital camera described above, a photographic file, a moving image file and an audio file created by shooting can be written into the memory card 47. The photographic file and the moving image file can also be displayed on the display 49 after being read from the memory card 47.

Further, by connecting the storage device 51 to the camera body 41, a photographic file, a moving image file and an audio file written into the memory card 47 of the camera body 41 can be transmitted to the storage device 51. The photographic file and the moving image file can also be displayed on the display 57 connected to the storage device 51 after being read from the storage device 51.

The storage device 51 is constituted for example by a personal computer. Transmission of a file written into the memory card 47 of the camera body 41 to the storage device 51 is controlled by a control circuit (not shown) provided to the storage device 51. With the memory card 47 of the camera body 41 regarded as a memory external to the storage device 51, the control circuit transmits a file read from the memory card 47 through the interfaces 48 and 53 to the storage medium 54 such as a hard disk or the like.

DISCLOSURE OF THE INVENTION

Problems to be Solved by the Invention

In the conventional digital camera, the operation of the interface 48 is controlled for example by a USB device controller. While a file written into the memory card 47 of the camera body 41 can be transmitted to the storage device 51, depending on the interface 48, it may be impossible to write a file stored in the storage medium 54 back to the memory card 47 of the camera body 41.

Accordingly, the decoder 55 and the video output circuit 56 should be provided to the storage device 51 in order to select a desirable file from multiple files accumulated in the storage medium 54 and to play back the selected file, which disadvantageously results in a complicated structure.

Thus, the present invention is intended to provide an image capture device and an image capture system capable of storing multiple files in the external storage device, and capable of playing back and outputting a desirable file of the multiple files accumulated in the external storage device even in a structure in which a simple external storage device without a decoder or a video output circuit is connected.

Means for Solving Problems

An image capture device of the present invention includes a main body which has an image capture function, and to and from which an external memory can be attached and detached. The main body includes: first signal processing means configured to create an image file by encoding image data obtained by image shooting; second signal processing means configured to create image data by decoding the image file created by the first signal processing means; a memory controller configured to write the image file obtained from the first signal processing means into the external memory, or to read an image file from the external memory; output means configured to output the image data obtained from the second signal processing means; an interface configured to make connection to an external storage device, the external storage device having a capacity larger than that of the external memory; a host controller configured to control transmission and receipt of data through the interface; and main control means configured to control operations of the memory controller and the host controller in order to transmit data between the external memory and the external storage device.

An image capture system of the present invention is formed by connecting the external storage device to the interface of the image capture device of the present invention.

In the image capture system, data can be transmitted between the external memory and the external storage device. Files written in the external memory are transmitted through the interface to the external storage device, so that multiple files are recorded in the external storage device. Thereafter, a desirable file of the multiple files accumulated in the external storage device can be written back to the external memory through the interface.

The file written in the external memory is thereafter supplied to the second signal processing means, and is thereafter decoded. Then, image data thereby obtained is output to a display, so that a still image or moving images can be played back.

In a specific structure, the main control means includes directory structure scaling up means configured to scale a directory structure in the external memory up to a directory structure in the external storage device when a file written in the external memory is transmitted to the external storage device. The main control means further includes directory structure scaling down means configured to scale a directory structure in the external storage device down to a directory structure in the external memory when a file stored in the external storage device is written back to the external memory.

In this specific structure, a directory structure is changed in the data transmission between the small-capacity external memory and the large-capacity external storage device. So, good access performance is obtained therebetween.

In another specific structure, with the directory structure in the external memory arranged as a directory section in the lowest level, the directory structure in the external storage device contains a roll management directory which is arranged in a level higher than that of the directory section, and which manages the directory section as a unit roll, and a date management directory which is arranged in a level higher than that of the roll management directory, and which manages the date of each roll.

In this specific structure, the directory structure in the external memory is maintained as it is in the data transmission between the external memory and the external storage device. So, better access performance is obtained therebetween.

In still another specific structure, the main control means has an image playback function for reading an image file from the external storage device, and for supplying the image file through the interface to the second signal processing means.

In this specific structure, a desirable file can be selected from the multiple files accumulated in the external storage device, and the selected file can be supplied through the interface to the second signal processing means. Thus, an image file is decoded to create image data, and the image data is then output to a display, so that a still image or moving images can be played back.

Effect of the Invention

According to the image capture device and the image capture system of the present invention, even in a structure in which a simple external storage device without a decoder or a video output circuit is connected, multiple files can be recorded in the external storage device, and a desirable file of the multiple files accumulated in the external storage device can be played back and output.

BEST MODE FOR CARRYING OUT THE INVENTION

An embodiment in which the present invention is implemented in a digital camera is described in detail with reference to drawings.

As shown in FIG. 1, a digital camera of the present invention has a camera body 1 including: an operation part 30; a CPU 31 for performing various control procedures in response to an operation signal from the operation part 30; and a memory 32 into which a control procedure to be performed by the CPU 31 is written. The CPU 31 and the memory 32 are connected to a bus 33.

In the camera body 1, image signal light from an optical system 6 is converted to an electric signal in a CCD 8. The electric signal is A/D converted, and is supplied thereafter to a JPEG encoding circuit 11 and to an MPEG-4 video encoding circuit 12. An audio signal from a microphone 7 is A/D converted, and is supplied thereafter to an AAC audio encoding circuit 13.

The JPEG encoding circuit 11 has an output terminal connected to the bus 33, and creates a photographic file under control of the CPU 31. The MPEG-4 video encoding circuit 12 and the AAC audio encoding circuit 13 have output terminals connected to the bus 33, and create a moving image file and an audio file under control of the CPU 31.

The created photographic file is supplied through the bus 33 to a JPEG decoding circuit 20. The created moving image file is supplied through the bus 33 to an MPEG-4 video decoding circuit 21 and to an AAC audio decoding circuit 22. The created audio file is supplied to the AAC audio decoding circuit 22.

The outputs of the JPEG decoding circuit 20 and the MPEG-4 video decoding circuit 21 are converted to image data in a video encoder 23. The image data is then passed to a changeover switch SW1 and an output amplifier 24, and is thereafter output to an image output terminal 1b. The image data is also passed to an LCD driver 34, and is thereafter output to a liquid crystal display 35 by the switching of the changeover switch SW1. The output of the AAC audio decoding circuit 22 is converted to an audio signal in a D/A conversion circuit 25. The audio signal is then passed to an output amplifier 26 and a changeover switch SW2, and is thereafter output to an audio output terminal 1c. The audio signal is also passed to the output amplifier 26 and a speaker amplifier 36, and is thereafter output to a speaker 37 by the switching of the changeover switch SW2.

The camera body 1 has a card drive 15 to and from which an external memory card 16 such as an SD card can be attached and detached. A memory controller 14 is placed between the card drive 15 and the bus 33.

The camera body 1 also has a USB terminal 1a to which a USB interface 17 is connected. A USB device controller 18 and a USB host controller 19 are placed in parallel relation between the USB interface 17 and the bus 33.

A cradle 2 can be connected to the USB terminal 1a, to the image output terminal 1b, and to the audio output terminal 1c of the camera body 1. The cradle 2 is provided with a USB device connector 27 and a USB host connector 28 to be connected in parallel relation to the USB terminal 1a, and an AV connector 29 to be connected to the image output terminal 1b and to the audio output terminal 1c.

An external hard disk drive 3 can be connected to the USB host connector 28 of the cradle 2. A monitor television receiver 4 and a speaker 5 can be connected to the AV connector 29.

The camera body 1 is provided with a light receiving part 38. The light receiving part 38 receives an infrared signal from a remote controller 39 and supplies the received signal to the CPU 31, thereby allowing remote control operation.

In the digital camera of the present invention, the USB host controller 19 of the camera body 1 and the USB host connector 28 of the cradle 2 are novel constituent elements the conventional structure lacks. Further, control by the CPU 31 described later employs a novel control procedure the conventional structure lacks.

An image capture system can be formed by connecting the external hard disk drive 3 to the camera body 1 through the cradle 2. As described later, this structure largely differs from the conventional structure in that a decoder or a video output circuit is not required to be connected to the external hard disk drive 3.

1. Recording into and Playback from External Memory Card 16

In the digital camera of the present invention shown in FIG. 1, a photographic file, a moving image file and an audio file created by shooting can be written into the external memory card 16 under control of the memory controller 14 of the camera body 1.

The photographic file written in the external memory card 16 is thereafter read under control of the memory controller 14. The read photographic file is supplied to the JPEG decoding circuit 20 to obtain image data from the output amplifier 24. The image data is then supplied from the cradle 2 to the monitor television receiver 4, so that a still image can be played back.

The moving image file written in the external memory card 16 is read under control of the memory controller 14. The read moving image file is supplied to the MPEG-4 video decoding circuit 21 and to the AAC audio decoding circuit 22 to obtain image data and an audio signal from the output amplifiers 24 and 26. The image data and the audio signal are then supplied from the cradle 2 to the monitor television receiver 4, so that moving images can be played back.

The audio file written in the external memory card 16 is read under control of the memory controller 14. The read audio file is supplied to the AAC audio decoding circuit 22 to obtain an audio signal from the D/A conversion circuit 25. The audio signal is then supplied from the cradle 2 to the speaker 5, so that a sound can be played back.

2. Recording into External Hard Disk Drive 3

A photographic file obtained from the JPEG encoding circuit 11 of the camera body 1 is output through the USB interface 17 to the USB terminal 1a under control of the USB host controller 19. The output photographic file is then supplied from the USB host connector 28 of the cradle 2 to the external hard disk drive 3, so that a still image can be recorded in the external hard disk drive 3.

A moving image file obtained from the MPEG-4 video encoding circuit 12 and the AAC audio encoding circuit 13 of the camera body 1 is output through the USB interface 17 to the USB terminal 1a under control of the USB host controller 19. The output moving image file is then supplied from the USB host connector 28 of the cradle 2 to the external hard disk drive 3, so that moving images can be recorded in the external hard disk drive 3.

An audio file obtained from the AAC audio encoding circuit 13 of the camera body 1 is output through the USB interface 17 to the USB terminal 1a under control of the USB host controller 19. The output audio file is then supplied from the USB host connector 28 of the cradle 2 to the external hard disk drive 3, so that a sound can be recorded in the external hard disk drive 3.

3. Data Transmission from External Memory Card 16 to External Hard Disk Drive 3

A file is read from the external memory card 16 under control of the memory controller 14 of the camera body 1. The read file is output through the USB interface 17 to the USB terminal 1a under control of the USB host controller 19, and is then supplied from the USB host connector 28 of the cradle 2 to the external hard disk drive 3. As a result, the file can be recorded in the external hard disk drive 3.

4. Writing Back from External Hard Disk Drive 3 to External Memory Card 16

Under control of the USB host controller 19 of the camera body 1, a specific file stored in the external hard disk drive 3 is read, passed to the cradle 2, and loaded into the USB interface 17 of the camera body 1. The file obtained from the USB interface 17 can be written back to the external memory card 16 under control of the memory controller 14.

5. Playback from External Hard Disk Drive 3

Under control of the USB interface 17 of the camera body 1, a specific photographic file stored in the external hard disk drive 3 is passed to the cradle 2, and is then loaded into the USB interface 17 of the camera body 1. The file obtained from the USB interface 17 is supplied to the JPEG decoding circuit 20 to obtain image data from the output amplifier 24. The image data is passed to the cradle 2, and is then supplied to the monitor television receiver 4, so that a still image can be played back.

Under control of the USB interface 17 of the camera body 1, a specific moving image file stored in the external hard disk drive 3 is passed to the cradle 2, and is then loaded into the USB interface 17 of the camera body 1. The file obtained from the USB interface 17 is supplied to the MPEG-4 video decoding circuit 21 and to the AAC audio decoding circuit 22 to obtain image data and an audio signal from the output amplifiers 24 and 26. The image data and the audio signal are passed to the cradle 2, and are then supplied to the monitor television receiver 4 and the speaker 5, so that moving images can be played back.

Under control of the USB interface 17 of the camera body 1, a specific audio file stored in the external hard disk drive 3 is passed to the cradle 2, and is then loaded into the USB interface 17 of the camera body 1. The file obtained from the USB interface 17 is supplied to the AAC audio decoding circuit 22 to obtain an audio signal from the output amplifier 26. The audio signal is passed to the cradle 2, and is then supplied to the speaker 5, so that a sound can be played back.

FIG. 26 shows a directory structure of files written in the external memory card 16 that employs the DCF standard. FIG. 27 shows a directory structure of files stored in the external hard disk drive 3.

As shown in FIG. 26, the DCF directory includes a folder "DCIM" placed in the root directory, and lower-level folders "100SANYO" to "999SANYO" that contain files of still images and moving images ("SANY0001" to "SANY9999").

As shown in FIG. 27, the directory structure formed in the external hard disk drive 3 includes DCF directories in the lowest level each employing the directory structure formed in the external memory card 16 in its entirety. Roll management folders "ROLL001," "ROLL0002," . . . , each of which is given a roll number with each DCF directory regarded as a unit, are created in a level higher than that of the DCF directories.

In transmission of files to the external hard disk drive 3, a date management folder containing the date of transmission is newly created in a level higher than that of the roll management folders, and two or more rolls with the same date are transmitted to the same date management folder. A date management folder with a different date is newly created as a date changes.

Further, a media management folder is created in a level higher than that of the date management folders. A resource management folder, an album management folder, and an index file are created to be in parallel with the media management folder.

A wallpaper image file, a BGM sound file, a switching effect masking file, and others are created in the resource management folder. Album files for setting the order of files to be played back, for setting the display period of still images, for setting switching effect, and for setting BGM are created in the album management folder.

The DCF directory structures formed in the external memory card 16 and the external hard disk drive 3 described above allow a DCF directory to be maintained in data transmission between the external memory card 16 and the external hard disk drive 3. This provides extremely satisfactory access performance of files.

FIGS. 2 to 22 explain control procedures performed by the CPU 31 when an SD card is employed as the external memory card 16.

FIG. 2 explains a basic flow. First, in step S0, an initial checkup is conducted after startup to find a remaining battery level, the available space of the SD card, and the like. Thereafter the presence or absence of a USB cable being connected is determined in step S1. In a camera mode in which a USB cable is not connected, determination is made between a recording mode and a playback mode in step S2. Then, a mode setting is performed according to its result.

In contrast, in a USB-connected mode in which a USB cable is connected, the type of the cable is determined in step S3. If the cable is judged to be a USB host cable to which an external hard disk drive is connected, a drive structure is checked up in step S4. If there is no library structure, a library structure is formed in step S5, and the flow thereafter goes to step S6.

In step S6, selection is made from a main menu of four items TRANSMISSION, PLAYBACK, ALBUM, and DISCONNECTION. If TRANSMISSION is selected, the flow passes through step S7 to go to a transmission mode. If PLAYBACK is selected, the flow passes through step S8 to go to a playback mode. If ALBUM is selected, the flow passes through step S8' to go to an album mode. If DISCONNECTION is selected, the USB connection is disconnected in step S10, and then the procedure is completed.

(Transmission Mode)

In the transmission mode, as shown in FIG. 3, a transmission direction is set to default "FROM SD (SD card) TO BOX (external hard disk drive)" in step S11. Thereafter in step S12, selection is made from a menu of four transmission modes TRANSMISSION EXECUTION, TRANSMISSION DIRECTION SETTING, INFORMATION DISPLAY, and MAIN MENU. The data volume of a transmission source is read in step S13, and the space of a transmission destination is read in step S14. Next, it is determined in step S15 whether or not transmission is possible. If transmission is impossible, a warning about space is displayed in step S17.

If transmission is possible, it is determined in step S18 whether or not TRANSMISSION EXECUTION was selected. If its result is YES, the flow goes to TRANSMISSION EXECUTION. Further, it is determined in step S19 whether or not INFORMATION DISPLAY was selected. If its result is YES, the flow goes to TRANSMISSION DIRECTION SETTING. Still further, it is determined in step S20 whether or not the transmission direction is "FROM BOX TO SD." If its result is NO, it is determined in step S21 whether or not POST-TRANSMISSION DELETION SETTING should be performed. If its result is YES, the flow goes to INFORMATION DISPLAY. If a result of step S21 is NO, the flow goes to step S23.

If a result of step S20 is YES, deletion setting is invalidated in step S22, and the flow thereafter goes to step S23.

It is determined in step S23 whether or not the main menu should be displayed. If its result is NO, the flow returns to step S12. If its result is YES, the flow returns to step S6 of FIG. 2.

In TRANSMISSION EXECUTION, as shown in FIG. 4, it is determined in step S31 whether a transmission direction is "FROM SD TO BOX." If its result is NO, the flow goes to step S51 of FIG. 5.

In contrast, if a result of step S31 of FIG. 4 is YES, the flow goes to step S32 in which date and time information is read. Then, it is determined in step S33 whether the BOX contains a date folder with the same date. If its result is NO, a date folder with this date is created in step S34, and a roll number is set to "001" in step S34'.

In contrast, if a result of step S33 is YES, the flow goes to step S35 in which the last roll number is read from the date folder with the same date. Then, it is determined in step S36 whether or not the read roll number is at or below "999". If a result of step S36 is NO, an error is displayed in step S38. Thereafter the flow returns to step S12 of FIG. 3. In contrast, if a result of step S36 of FIG. 4 is YES, 1 is added to the last roll number in step S37, and a result thereby obtained is employed as a roll number.

Next, a new roll management folder given the roll number is created in the BOX in step S39, and a DCIM folder is created in the new roll in step S40. Then, a folder number is set to "100" according to the DCF standard in step S41, the number of folders in a DCIM folder in the SD card is counted in step S42, and the first folder in the SD card is set as a transmission source in step S43.

Thereafter, a new folder given the folder number is created in the BOX in step S44, and data in the folder is transmitted from the SD card to the BOX in step S45. Next, it is determined in step S46 whether or not there is a folder yet to be transmitted. If its result is YES, the flow goes to step S47 in which a next folder in the SD card is set as a transmission source. Then, a folder number is counted up in step S48.

In contrast, if a result of step S46 is NO, it is further determined in step S49 whether the data should be deleted after transmission. If its result is YES, the data in the SD card as a transmission source is deleted in step S50, and the flow thereafter returns to step S6 of FIG. 2.

If a result of step S31 of FIG. 4 is NO, it is first determined in step S51 of FIG. 5 whether or not there is a DCIM folder. If its result is NO, a DCIM folder is created in step S52, and then a folder number is set to "100" in step S53.

If a result of step S51 is YES, the last folder number is read in step S54. Then, it is determined in step S55 whether or not the read folder number is at or below "999". If its result is NO, an error is displayed in step S57. Thereafter the flow returns to step S12 of FIG. 3.

In contrast, if a result of step S55 of FIG. 5 is YES, 1 is added to the last folder number in step S56, and a result thereby obtained is employed as a folder number.

Next, the number of folders in a roll is counted in step S58, and the first folder in the roll is set as a transmission source in step S59. Thereafter, a new folder given the folder number is created in the SD card in step S60, and data in the folder is transmitted from the BOX to the SD card in step S61.

Next, it is determined in step S62 whether or not there is a folder yet to be transmitted. If its result is YES, a next folder in the BOX is set as a transmission source in step S63. Thereafter a folder number is counted up in step S64, and then the flow returns to step 60. If a next result of step S62 is NO, the flow returns to step S6 of FIG. 2.

In TRANSMISSION DIRECTION SETTING, a transmission direction is selected from "FROM SD TO BOX," "FROM BOX TO SD," and "CANCEL" in step S71 of FIG. 6. If "FROM SD TO BOX" is determined in step S72, the flow goes to step S73 in which the transmission direction is set to "FROM SD TO BOX." If "FROM BOX TO SD" is determined in step S74, the flow goes to step S75 in which the transmission direction is set to "FROM BOX TO SD."

After the display of a transmission direction is updated in step S76, the flow returns to step S12 of FIG. 3.

In contrast, if "CANCEL" is determined in step S74 of FIG. 6, it is determined in step S77 whether or not canceling should be performed. If its result is NO, the flow returns to step S71. If its result is YES, the flow returns to step S12 of FIG. 3.

In INFORMATION DISPLAY, display of information is selected from "BOX INFORMATION," "SD CARD INFORMATION," and "CANCEL" in step S81 of FIG. 7. If "BOX INFORMATION" is determined in step S82, the flow goes to step S83 in which the available space of the BOX and the number of rolls stored are read. If "SD CARD INFORMA- TION" is determined in step S84, the flow goes to step S85 in which SD data volume and the number of files are read.

Next, an information display screen is updated in step S86, and the flow thereafter returns to step S12 of FIG. 3.

In contrast, if "CANCEL" is selected in step S84 of FIG. 7, it is determined in step S87 whether or not canceling should be performed. If its result is NO, the flow returns to step S81. If its result is YES, the flow returns to step S12 of FIG. 3.

In POST-TRANSMISSION DELETION SETTING, selection is made between "DELETE AFTER TRANSMISSION" and "NOT DELETE AFTER TRANSMISSION" in step S91 of FIG. 8. If "DELETE AFTER TRANSMISSION" is determined in step S92, "DELETE" is set ON in step S94. If "NOT DELETE AFTER TRANSMISSION" is determined in step S93, "DELETE" is set OFF in step S95, and then the flow returns to step S12 of FIG. 3.

In contrast, no determination is made in step S93 of FIG. 8, it is determined in step S96 whether or not canceling should be performed. If its result is NO, the flow returns to step S91. If its result is YES, the flow returns to step S12 of FIG. 3.

(Playback Mode)

In the playback mode, default "BOX" is set by default as media setting in step S101 of FIG. 9, and "ROLL VIEW" is set as view setting in step S102.

Thereafter in step S103, it is determined which one of "ROLL," "CALENDAR," and "SD CARD" is set in the view setting.

If "ROLL" is set, a roll view display such as a roll selection list and view selection (see FIG. 23(d)) is presented in step S104. If "CALENDAR" is set, a calendar view display such as a date selection list and view selection (see FIG. 23(e)) is presented in step S105. Next, a roll selection display such as a roll selection list and view selection (see FIG. 23(g)) is presented in step S107. If "SD CARD" is set, an SD card view display such as card selection (see FIG. 23(f)) is presented in step S106.

Roll information is thereby read and a selection list is displayed according to each view setting, so that a roll to be played back is specified.

It is determined in step S108 whether or not a roll to be played back is decided. If its result is YES, the flow goes to a roll playback procedure (B-1). Next, it is determined in step S109 whether or not view selection was made. If its result is YES, the flow goes to a view selection procedure (B-3). Further, it is determined in step S110 whether or not a "T" key was operated. If its result is YES, the flow goes to a folder selection procedure (B-4).

If a result of step S110 is NO, the flow returns to step S103 to repeat determination of the view setting.

In the roll playback procedure, a single image is played back (see FIG. 23(h)) in step S111 of FIG. 10, and thereafter, it is determined in step S112 whether or not a "W"key was operated. If its result is NO, the flow returns to step S111 to continue the playback of the single image. If a result of step S112 is YES, multiple images are played back on nine screens (see FIG. 23(i)) in step S113.

Then, it is determined in step S114 whether or not the "T" key was operated. If its result is YES, the flow returns to step S111 to play back a single image. If a result of step S114 is NO, the flow goes to step S115 in which it is determined whether or not the "W" key was operated. If its result is NO, the flow returns to step S113 to continue the playback of the multiple images on nine screens. If its result is YES, the flow goes to the folder selection (B-4).

As described, in the roll playback, a playback mode incorporated as an original camera function is employed when a roll to be played back is decided.

In the view selection procedure, a view selection display for making selection from "ROLL VIEW," "CALENDAR VIEW," and "SD CARD VIEW" (see FIGS. 23(a), (b), (c)) is presented in step S131 of FIG. 11. If "ROLL VIEW" is determined in step S132, a roll is set to "VIEW" in step S133. If "CALENDAR VIEW" is determined in step S134, a calendar is set to "VIEW" in step S135. If "SD CARD VIEW" is determined in step S136, an SD card is set to "VIEW" in step S137.

Then, it is determined in step S138 whether or not "RETURN" operation was performed. If its result is NO, the flow returns to step S131 to repeat the view selection display. In contrast, if a result of step S138 is YES, view selection information is saved in step S139. Thereafter the flow returns to step S103 of FIG. 9.

In the folder selection procedure, a folder selection screen including a list of folders and a roll selection image (see FIGS. 23 (j)) is displayed in step S121 of FIG. 12. Next, it is determined in step S122 whether or not a folder to be played back is decided. If its result is YES, the flow goes to the playback procedure (B-1).

If a result of step S122 is NO, the flow goes to step S123 in which it is determined whether or not an operation for roll selection was performed. If its result is YES, the flow returns to step S103 of FIG. 9 to perform roll selection.

If a result of step S123 is NO, the flow goes to step S124 in which it is determined whether or not the "W" key was operated. If its result is YES, the flow returns to step S103 of FIG. 9 to perform roll selection.

In contrast, if a result of step S124 is NO, the flow goes to step S125 in which it is determined whether or not the "T" key was operated. If its result is NO, the flow returns to step S121 to repeat the display of the folder selection screen. If its result is YES, the flow goes to step S113 of FIG. 10 in which multiple images are played back on nine screens.

FIG. 23 shows transitions of a series of display screens in response to operations when "PLAYBACK" is selected from "DATA TRANSMISSION," "PLAYBACK," and "ALBUM" on the main menu.

After the main menu is displayed, a roll (date) view of FIG. 23(d) is displayed. In the roll (date) view, a roll number and a date are displayed as a pair. When one roll is selected from this view, a predetermined single file contained in the selected roll (such as the last file in the last folder) is played back and then displayed as shown in (h).

A target of display can be switched to a next file by operating an image-feed key, with one file displayed as shown in (h). A target of display can be switched among folders. If a target of display is to be switched to a different roll, a roll is selected first.

When the image-feed key is operated leftward with the roll (date) view of (h) displayed, a roll (date) view switching screen of (a) appears. When the image-feed key is further operated downward with this screen displayed, a calendar view switching screen shown of (b) appears. When the image-feed key is operated rightward in this state, a calendar view of (e) appears.

In the calendar view, those dates on which rolls exist are marked in the calendar. When one date is selected from these dates, all rolls with the selected date are displayed in list form as shown in (g). When one roll is selected in this state, a predetermined single file contained in the selected roll (such as the last file in the last folder) is played back and then displayed as shown in (h).

When the image-feed key is operated downward with the calendar view switching screen of (b) displayed, an SD card view switching screen of (c) appears. When the image-feed key is operated rightward in this state, an SD card view of (f) appears.

In the SD card view, an indication that a card is a target of playback is displayed. When a card is selected in this state, a predetermined single file contained in the selected card (such as the last file in the last folder) is played back and then displayed as shown in (h).

When the "T" key is operated with the roll view of (d), with the calendar view of (e), or with the SD card view of (f) displayed, a folder selection screen shown in (j) appears. When one folder is selected therefrom and then the "T" key is operated, a plurality of files contained in the selected folder are displayed on multiple screens as shown in (i). When one file is selected therefrom and then the "T" key is operated, the selected file is played back and then displayed as shown in (h).

When the "W" key is operated with one file displayed as shown in (h), multiple screens of a folder containing the displayed file is displayed as shown in (i). When the "W" key is further operated in this state, a folder selection screen of a roll containing this folder is displayed as shown in (j).

When the "W" key is further operated in this state, the roll view of (d), the calendar view of (e), or the SD card view of (f) is displayed again.

As described, a predetermined single file can directly be displayed as shown in (h) only by selecting one roll in the roll (date) view of FIG. 23(d). Then, display is switched to a next image in this state, so that a desirable single image can be displayed. Or, after a roll is selected on the roll (date) view of FIG. 23(d), a folder is selected on the folder selection screen of (j), and a file is selected on the display of multiple screens of (i), a desirable single file can finally be displayed as shown in (h).

Thus, a user can select a preferable way from these two ways of file display.

(Album Mode)

In the album mode, a list of album files already created is searched first, and a result thereof is displayed in step S141 of FIG. 13. Next, in step S142, an album menu is displayed on which it is determined whether an album to be played back should be selected from the album list, whether an album should be edited (changed), whether an album should be deleted, or whether an album should be newly played back (see FIG. 24(b)).

If an album to be played back is selected, the flow goes to an album playback procedure (C-1) in step S143. If NEW ALBUM CREATION is selected, the flow goes to a new album creation procedure (C-2) in step S144. If ALBUM EDITION is selected, the flow goes to an album edition procedure (C-3) in step S145. If ALBUM DELETION is selected, the flow goes to an album deletion procedure (album deletion) in step S146. If MAIN MENU is selected, the main menu is displayed again in step S147.

In ALBUM PLAYBACK, the first file in an album is displayed in step S151 of FIG. 14, and thereafter, playback of the album is started in step S152. Then, it is determined in step S153 whether or not an operation for stopping the album playback was performed. If its result is YES, the flow returns to step S141 of FIG. 13 in which the search of the album list and display are performed.

If a result of step S153 of FIG. 14 is NO, the flow goes to step S154 in which it is determined whether or not the album has been played back to the end. If its result is YES, the flow returns to step S141 of FIG. 13 in which the search and display of the album list are performed.

In NEW ALBUM CREATION, after the number of a new album is extracted in step S161 of FIG. 15, the new album is created while being given the new album number as its file name in step S162. Next, a file counter FC, a file pointer F_PTR, and an insert pointer I_PTR are each set to zero in step S163, and the flag of an edit marker is set to "False" in step S164. Thereafter the flow goes to step S167.

In ALBUM EDITION, the file counter FC is read, and the file pointer F_PTR and the insert pointer I_PTR are each set to zero in step S165 of FIG. 15. Further, the flag of an edit marker is set to "True" in step S166. Thereafter the flow goes to step S167.

In step S167, the head of the last roll is designated first as a reference position of a file when it is added. Next, the display of an album creation operation screen is updated in step S168. Thereafter it is determined in step S169 whether or not file addition was instructed. If its result is YES, an "insert pointer" described later is displayed in step S170, and "ADD" is thereafter set as a command variable cmd.

Next, it is determined in step S172 whether or not file move was instructed. If its result is YES, a "file pointer"described later is displayed in step S173, and "MOVE" is thereafter set as the command variable cmd.

Further, it is determined in step S175 whether or not file deletion was instructed. If its result is YES, a "file pointer" is displayed in step S176, and "DELETE" is thereafter set as the command variable cmd.

Next, it is determined in step S178 of FIG. 16 whether or not an operation for bringing the pointers forward was performed. If its result is YES, it is determined in step S179 whether or not the pointers can be moved. If its result is YES, the flow goes to step S180 in which the file pointer F_PTR and the insert pointer I_PTR are each counted up by one.

Next, it is determined in step S181 whether or not an operation for bringing the pointers backward was performed. If its result is YES, it is determined in step S182 whether or not the pointers can be moved. If its result is YES, the flow goes to step S183 in which the file pointer F_PTR and the insert pointer I_PTR are each counted down by one.

Then, it is determined in step S184 whether or not an operation for executing the command variable cmd was performed. If its result is YES, it is determined in step S185 whether or not the command variable cmd is "ADD." If its result is YES, the flow goes to an addition procedure described later. It is determined in step S186 whether or not the command variable cmd is "MOVE." If its result is YES, the flow goes to a move procedure described later. Further, it is determined in step S187 whether or not the command variable cmd is "DELETE." If its result is YES, the flow goes to a deletion procedure described later.

If a result of step S184 is NO, the flow goes to step S188 in which it is determined whether or not NEW ALBUM CREATION or ALBUM EDITION is completed. If its result is NO, the flow returns to step S168 of FIG. 15 to update the display of the album creation operation screen. In contrast, if a result of step S188 of FIG. 16 is YES, the flow goes to an album setting procedure described later.

File Addition

In the file addition procedure, the position of an additional file is read in step S191 of FIG. 17, and an additional file selection screen containing a file list (see FIG. 24(f)) is displayed in step S192.

Then, it is determined in step S193 whether or not an operation for bringing file selection forward was performed. If its result is YES, a selection mark is brought forward in step S194. Next, it is determined in step S195 whether or not an operation for bringing file selection backward was performed. If its result is YES, a selection mark is brought backward in step S196. The move is performed in this way under the same condition as that in the playback mode.

Next, it is determined in step S197 whether or not an operation for folder selection was performed. If its result is YES, the flow goes to a folder selection procedure described later.

If a result of step S197 is NO, it is determined in step S198 whether or not an operation for accepting the selected file was performed. If its result is NO, the flow returns to step S192 so that the additional file selection screen continues to be displayed.

In contrast, if a result of step S198 is YES, the flow goes to step S199 in which the album file is operated to add the selected file to the position of the insert pointer I_PTR.

Next, the file counter FC is counted up by one in step S200, and the file pointer F_PTR and the insert pointer I_PTR are each counted up by one in step S201. The pointers are thereby incremented according to the additional file.

Then, the position of the additional file is saved in step S202, and the flow thereafter returns to step S167 of FIG. 15.

In the folder selection procedure, as shown in FIG. 18, a folder selection screen containing a folder list (see FIG. 24(g)) is displayed in step S211.

Then, it is determined in step S212 whether or not an operation for bringing folder selection forward was performed. If its result is YES, a selection mark is brought forward in step S213. Next, it is determined in step S214 whether or not an operation for bringing folder selection backward was performed. If its result is YES, a selection mark is brought backward in step S215. It is also determined in step S216 whether or not an operation for roll selection was performed. If its result is YES, the flow goes to a roll selection procedure described later.

If a result of step S216 is NO, it is determined in step S217 whether or not an operation for accepting the selected folder was performed. If its result is NO, the flow returns to step S211 so that the folder selection screen continues to be displayed. In contrast, if a result of step S217 is YES, the flow returns to step S192 of FIG. 17 to display the additional file selection screen.

In the roll selection procedure, a roll selection screen containing a roll list (see FIG. 24(h)) is displayed in step S221 of FIG. 19. Then, it is determined in step S222 whether or not an operation for bringing roll selection forward was performed. If its result is YES, a selection mark is brought forward in step S223. Next, it is determined in step S224 whether or not an operation for bringing roll selection backward was performed. If its result is YES, a selection mark is brought backward in step S225.

Next, it is determined in step S226 whether or not an operation for accepting the selected roll was performed. If its result is NO, the flow returns to step S221 so that the roll selection screen continues to be displayed. If a result of step S226 is YES, the flow returns to step S211 of FIG. 18 to display the folder selection screen.

File Move

In the file move procedure, an indication for confirming a file to be moved is displayed in step S231 of FIG. 20, and thereafter, an "insert pointer" (see FIG. 24(j)) is displayed in step S232.

Next, it is determined in step S233 whether or not an operation for bringing the insert pointer forward was performed. If its result is YES, it is determined in step S234 whether or not the insert pointer can be moved. If its result is YES, the insert pointer I_PTR is counted up by one in step S235, and the display of the album creation operation screen is updated in step S236.

Next, it is determined in step S237 whether or not an operation for bringing the insert pointer backward was performed. If its result is YES, it is determined in step S238 whether or not the insert pointer can be moved. If its result is YES, the insert pointer I_PTR is counted down by one in step S239, and the display of the album creation operation screen is updated in step S240.

Then, it is determined in step S241 whether or not specification of a location to which the file is to be moved is completed. If its result is NO, the flow returns to step S233 to continue the move of the insert pointer. In contrast, if a result of step S241 is YES, the flow goes to step S242 in which the album file is operated and the file to be moved is moved to the position of the insert pointer I_PTR. Then, the flow returns to step S167 of FIG. 15.

File Deletion

In the album deletion procedure, an applicable item is deleted from the album file in step S251 of FIG. 21, the file counter FC is counted down by one in step S252, and the flow thereafter returns to step S167 of FIG. 15.

Album Setting

In the album setting procedure, an album setting menu including selection of display period of still images, selection of switching effect, selection of BGM and the like is displayed in step S261 of FIG. 22.

Then, it is determined in step S262 whether or not "DISPLAY PERIOD OF STILL IMAGES" was selected. If its result is YES, the flow goes to step S263 to set the display period of still images. Next, it is determined in step S264 whether or not "SWITCHING EFFECT" was selected. If its result is YES, the flow goes to step S265 to set switching effect. It is also determined in step S266 whether or not "BGM" was selected. If its result is YES, the flow goes to step S267 to set BGM.

Next, it is determined in step S268 whether or not an operation for saving the album setting was performed. If its result is NO, the flow returns to step S261 so that the setting menu continues to be displayed. If a result of step S268 is YES, it is further determined in step S269 whether or not the album setting was saved. If its result is NO, the flow returns to step S141 of FIG. 13 to repeat the procedures on the album menu.

In contrast, if a result of step S269 is YES, the flow goes to step S270 in which it is determined whether or not an edit marker is "True." If its result is NO, it is judged that a newly created album is being processed. Then, the new album is saved in step S272, and the flow thereafter returns to step S141 of FIG. 13 to repeat the procedures on the album menu.

In contrast, if a result of step S270 of FIG. 22 is YES, it is judged that the already existing album is being edited. Then, it is further determined in step S271 whether or not the album is to be overwritten. If its result is NO, the flow goes to step S272 to perform a newly save. If its result is YES, the flow goes to step S273 to overwrite the album. Thereafter the flow returns to step S141 of FIG. 13 to repeat the procedures on the album menu.

FIG. 24 shows transitions of a series of display screens in response to operations when "ALBUM" is selected from "DATA TRANSMISSION," "PLAYBACK," and "ALBUM" on the main menu.

When "ALBUM" is selected from the main menu including "DATA TRANSMISSION," "PLAYBACK," and "ALBUM" on the main menu shown in FIG. 24(a), a selection screen of an album file to be played back is displayed as shown in (b). By selecting one album file therefrom, and by operating a "SET KEY", the selected album file can be played back. In contrast, by selecting one album file therefrom, and by selecting ALBUM EDITION, the selected album file is displayed in a box in dashed lines as shown in (d). If the selection is confirmed, selection buttons "ADD," "MOVE," and "DELETE" appear as shown in (e).

If "ADD" is selected, an insert pointer indicating an insertion position of a file appears in the form of a triangular mark. After the insertion position is determined by a key operation, a file to be added can be designated while switching is made among the file selection screen shown in (f), the folder selection screen shown in (g), and the roll selection screen shown in (h).

After one file is selected from the file selection screen of (f), the screen of (e) is displayed again. Then, the selected file is inserted into the position of the insert pointer, by which the file is added.

If "MOVE" is selected on the screen of (e), a file to be moved is displayed in a box in bold lines as shown in (i). When the file to be moved is selected, the selected file is indicated by a file pointer (box in dashed lines) as shown in (j), and the thumbnail image of the selected file is displayed at all times on the screen. At the same time, an insert pointer (triangular mark) for designating a destination is displayed.

Then, the insert pointer is moved to designate the destination. If a file to be moved disappears from the screen as a result of scrolling in this process, the thumbnail of the file to be moved is displayed on the screen, so that no inconvenience is caused.

After the destination of the file is designated, a sequence of files including the file to be moved that has been moved to the destination is displayed as shown in (k).

FIG. 25 shows how a file is added and moved using the pointers described above. When a file is to be added, an insert pointer in the form of a triangular mark appears, and a new file "New" is inserted into the position of the insert pointer.

When a file is to be moved, a file "A" selected as a file to be moved is identified by a pointer in the form of a box in bold lines. When the file to be moved is confirmed, the file is identified by a file pointer in the form of a box in dashed lines. Then, the file identified by the file pointer is moved to the position of an insert pointer in the form of a triangular mark.

The addition and the move of a file described above are realized by editing a link file, and a file and a position can be selected among folders or rolls. Thus, a file can freely be added to a file list of files to be played back, or moved.

When a file is to be deleted, file selected as a file to be deleted is identified by a pointer in the form of a box in bold lines. The file identified by the pointer is removed from the file list by executing deletion. However, the file itself is not deleted.

The digital camera of the present invention described above has a structure in which the external hard disk drive 3 is connected through the cradle 2 to the camera body 1 as shown in FIG. 1. In this structure, a file written in the external memory card 16 can be transmitted to the external hard disk drive 3 under control of the CPU 31 of the camera body 1.

Thus, unlike the conventional structure, this does not require control of data transmission by a personal computer by connecting the personal computer to an external hard disk drive, thereby providing convenience.

Further, a desirable file is selected from a plurality of files accumulated in the external hard disk drive 3, and the selected file is loaded into the camera body 1. Then, the file is decoded in the JPEG decoding circuit 20, the MPEG-4 video decoding circuit 21, or the AAC audio decoding circuit 22 incorporated in the camera body 1, so that an image or a sound can be played back.

So, unlike the conventional structure, this does not require a decoder or a video output circuit to be connected to an external hard disk drive, thereby simplifying a structure.

Still further, a DCF directory is maintained in data transmission between the memory controller 14 and the external hard disk drive 3. Thus, extremely satisfactory access performance of files is realized, so the speed of data transmission is enhanced.

The structure of each part of the present invention is not limited to that shown in the embodiment described above. Various modifications may be devised within the technical scope defined in claims. As an example, the embodiment shown in FIG. 1 employs a structure in which the cradle 2 is connected to the camera body 1. Alternatively, the USB device connector 27, the USB host connector 28 and the AV connector 29 of the cradle 2 may be provided in the camera body 1, so that the cradle 2 can be omitted.

Besides, the external memory card 16 such as an SD card is employed as an external memory, and the external hard disk drive 3 is employed as an external storage device, to which the present invention is not intended to be confined. Various types of known external memories and external storage devices may be employed.

Figure 1:
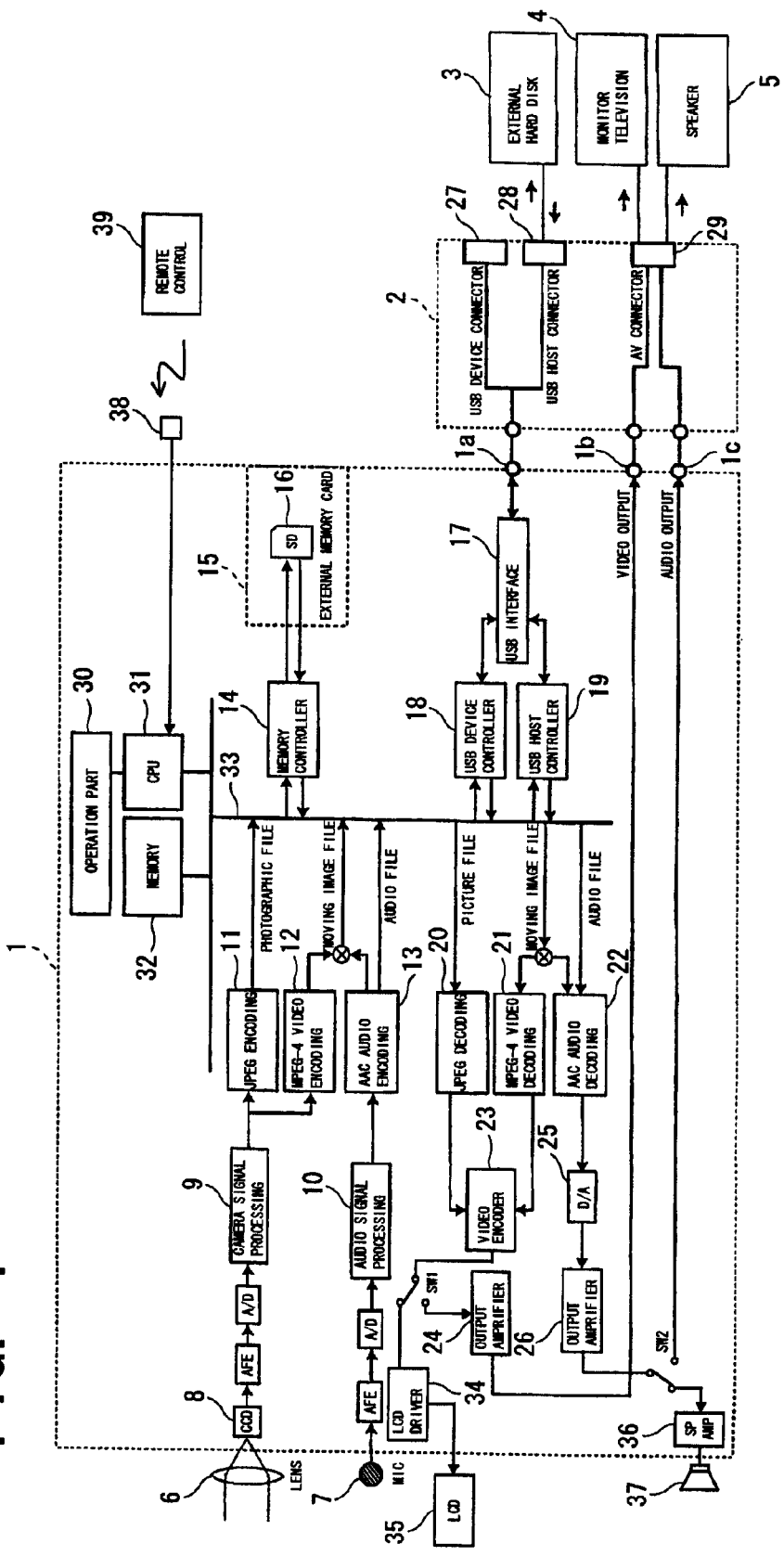
FIG. 1 is a block diagram showing the structure of a digital camera according to the present invention.
Figure 2:
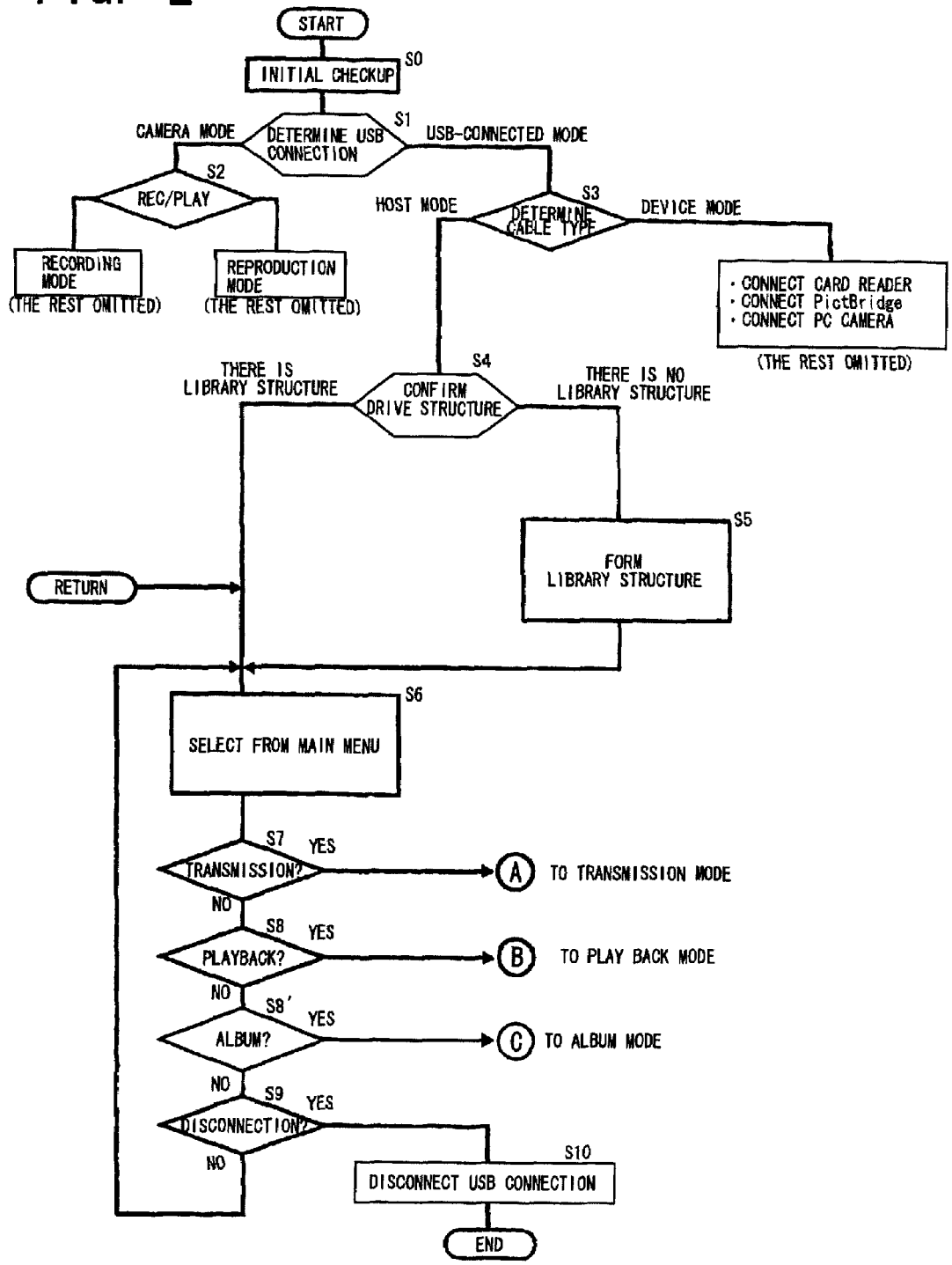
FIG. 2 is a flow chart for explaining the basic flow of a control procedure performed by a CPU of a camera body.
Figure 3:
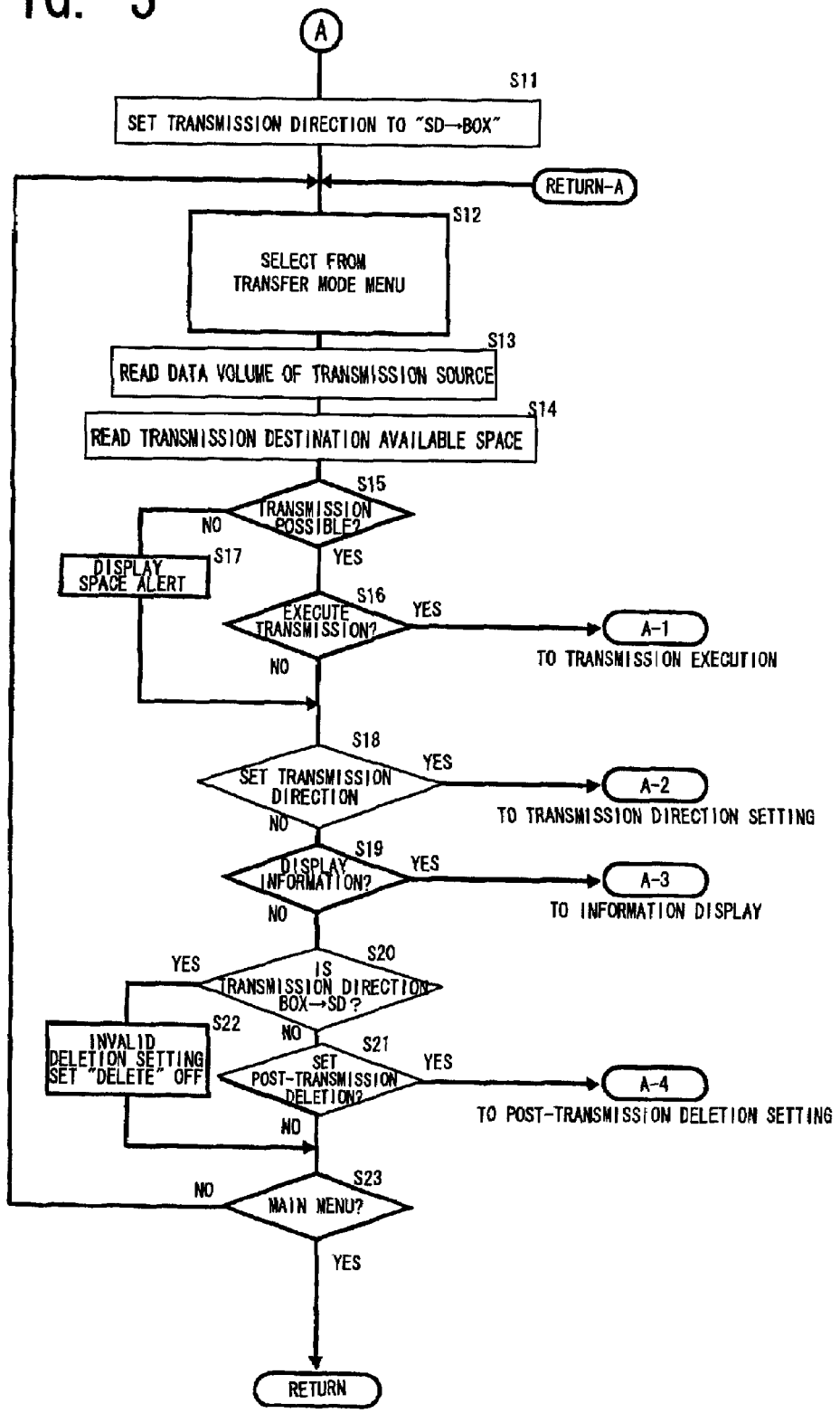
FIG. 3 is a flow chart for explaining a processing flow in a transmission mode in the control procedure.
Figure 4:
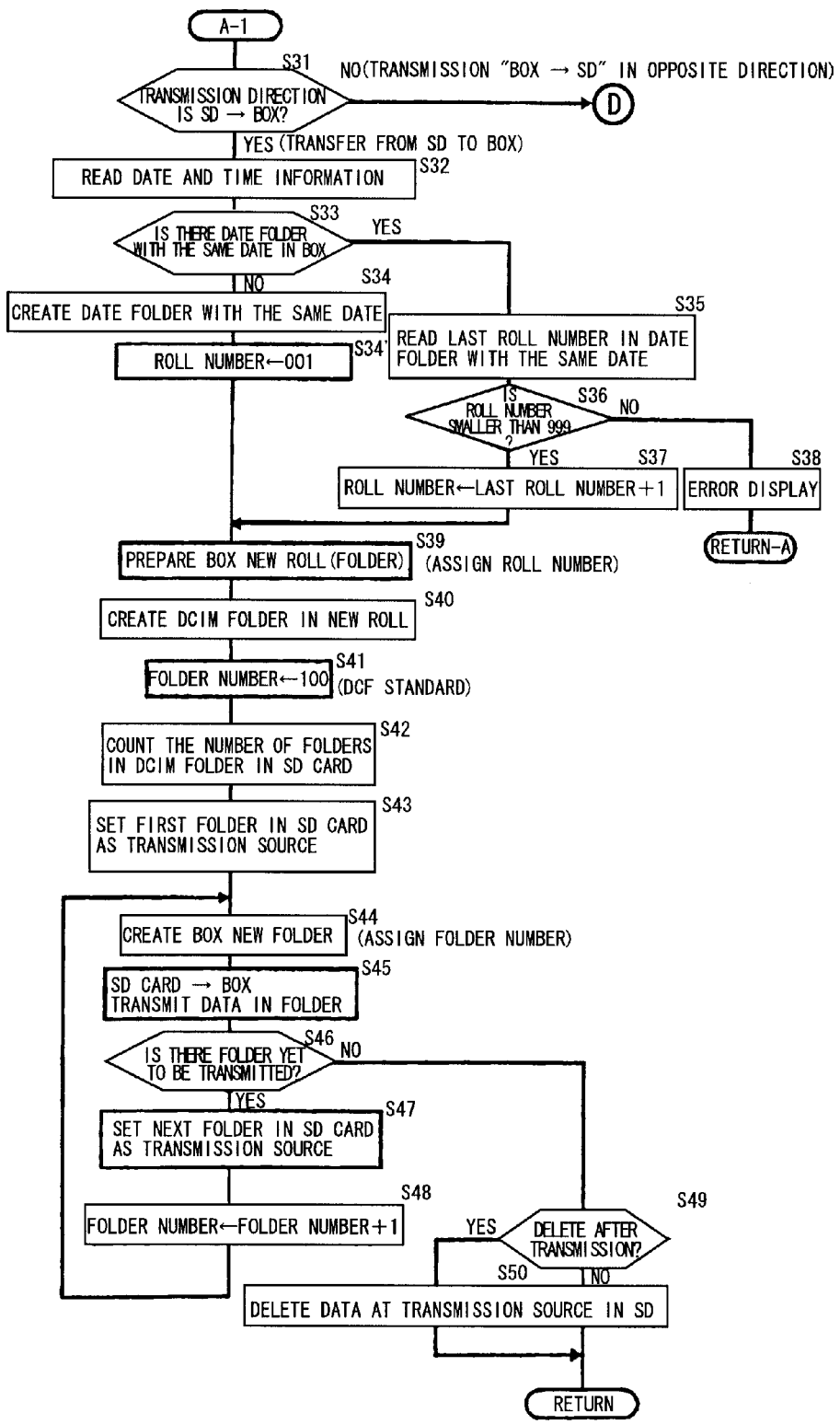
FIG. 4 is a flow chart for explaining a transmission execution procedure in the transmission mode.
Figure 5:
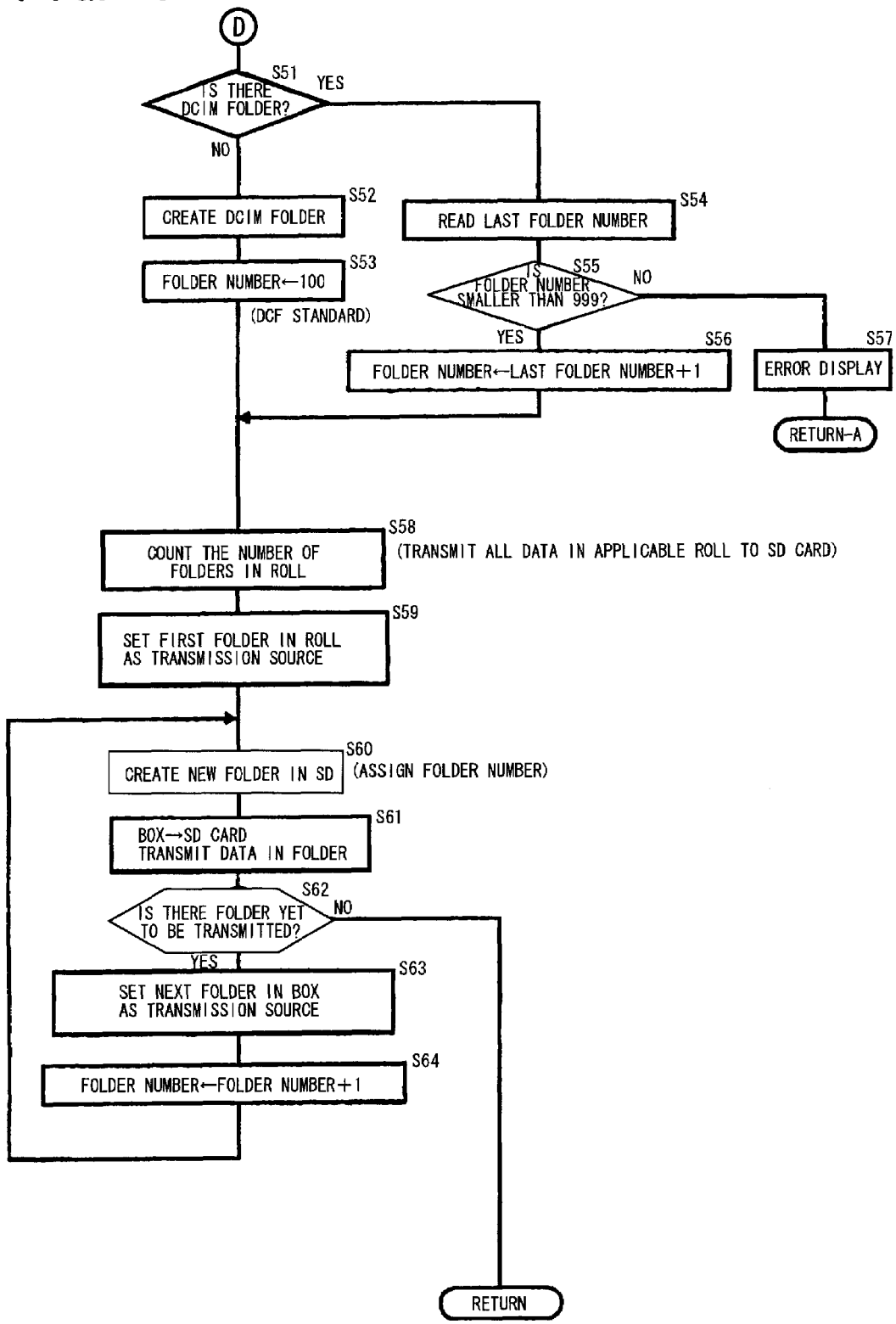
FIG. 5 is a flow chart for explaining a transmission execution procedure in the opposite direction in the transmission mode.
Figure 6:
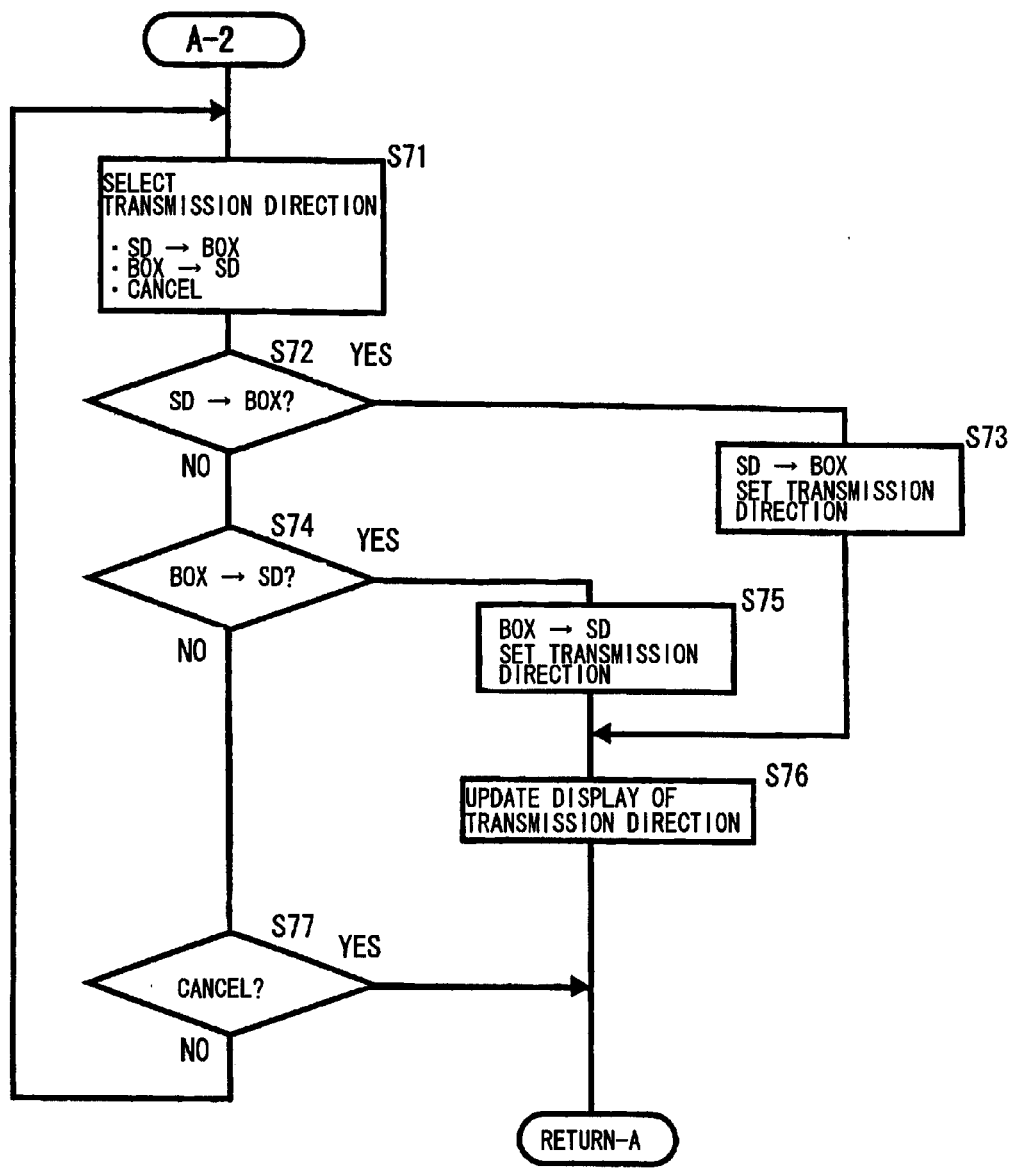
FIG. 6 is a flow chart for explaining a transmission direction setting procedure in the transmission mode.
Figure 7:
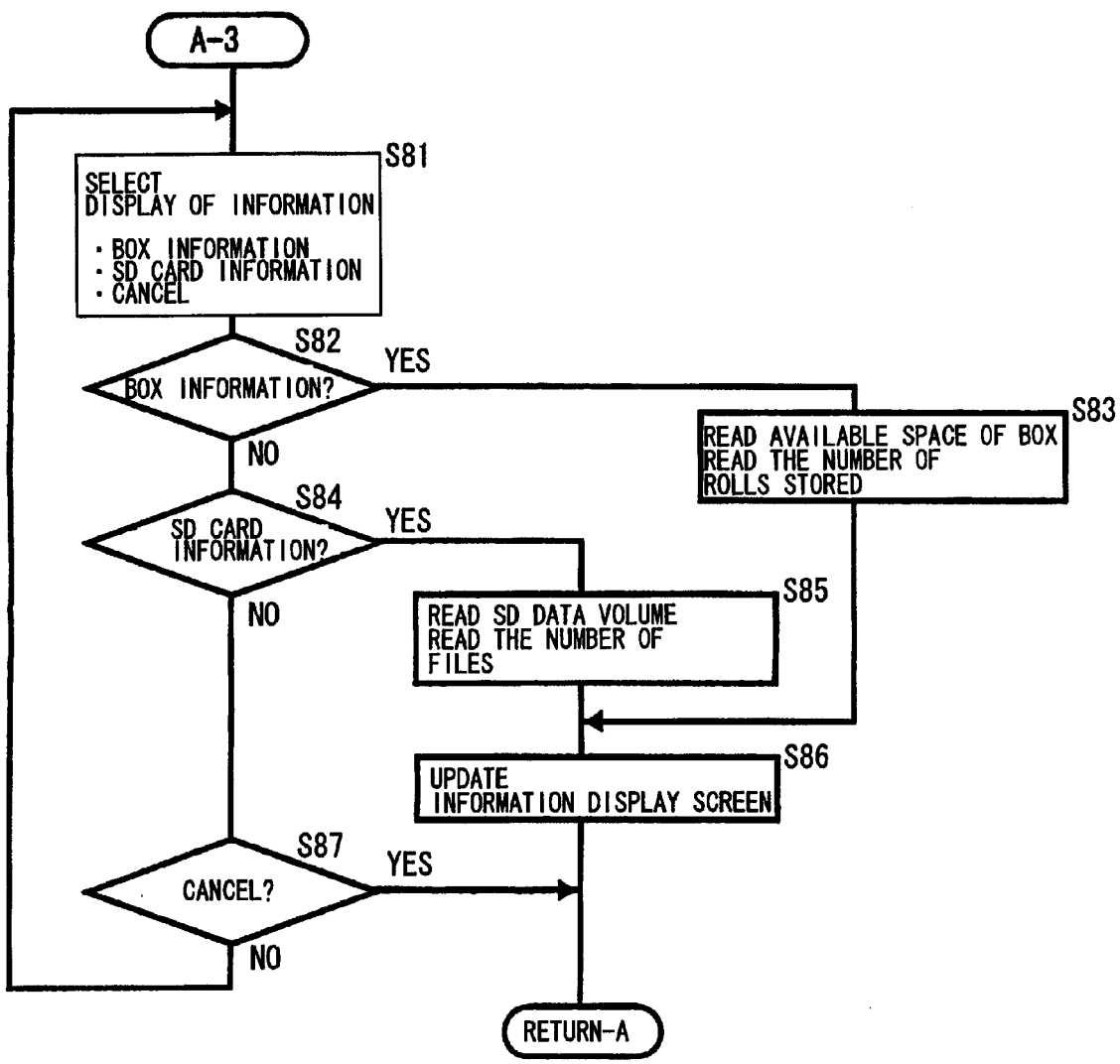
FIG. 7 is a flow chart for explaining an information display procedure in the transmission mode.
Figure 8:
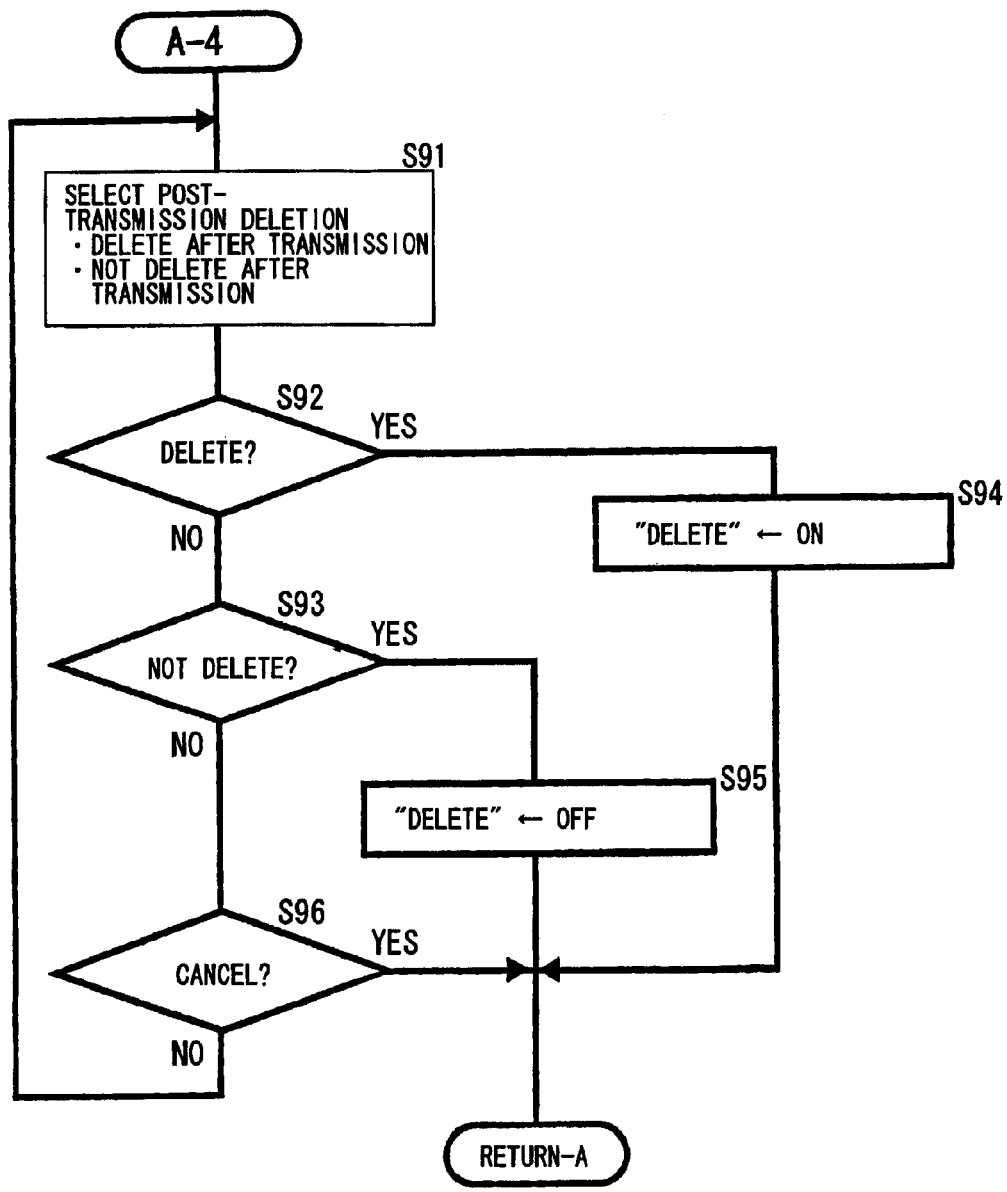
FIG. 8 is a flow chart for explaining a post-transmission deletion setting procedure in the transmission mode.
Figure 9:
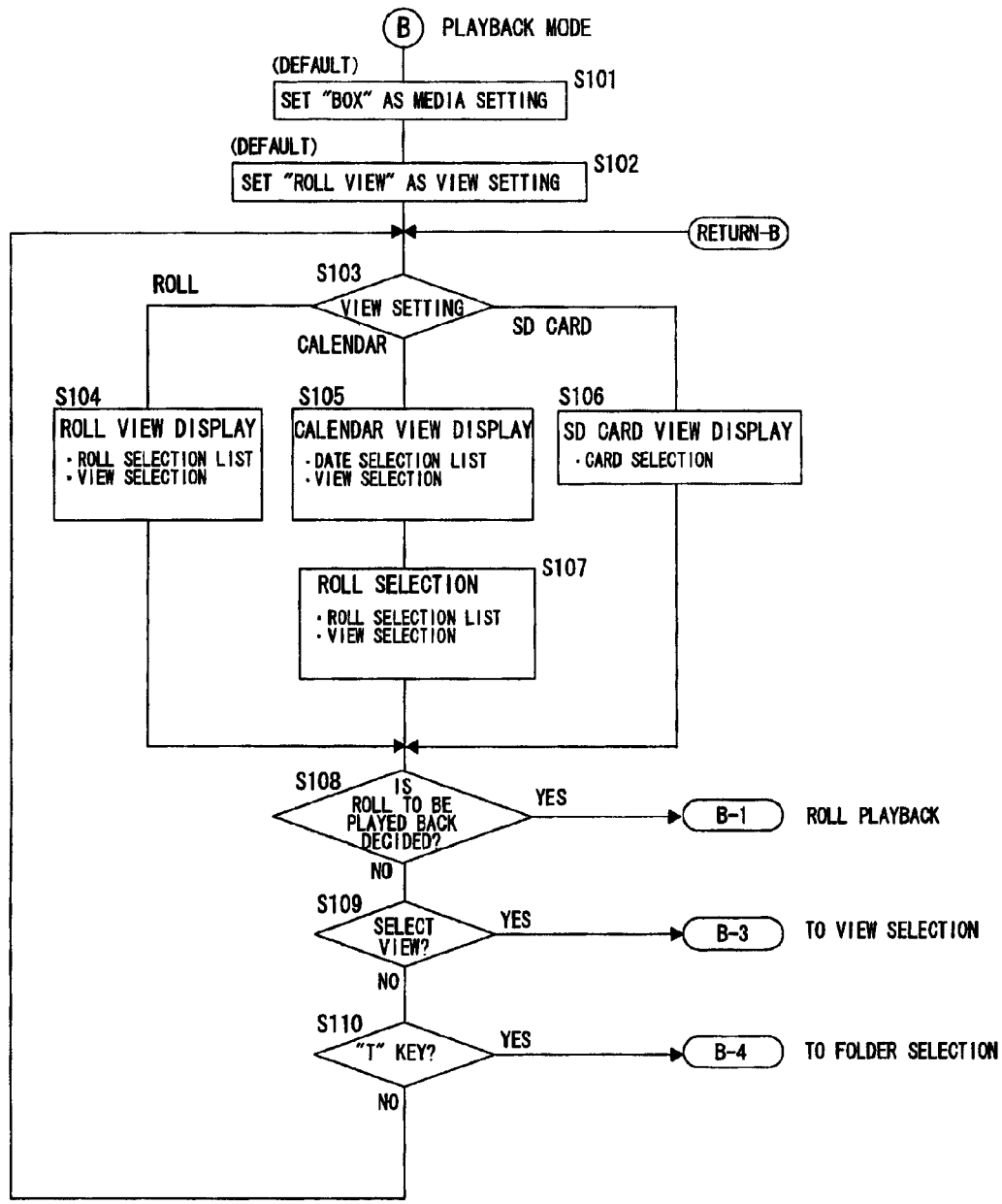
FIG. 9 is a flow chart for explaining a processing flow in a playback mode in the control procedure.
Figure 10:
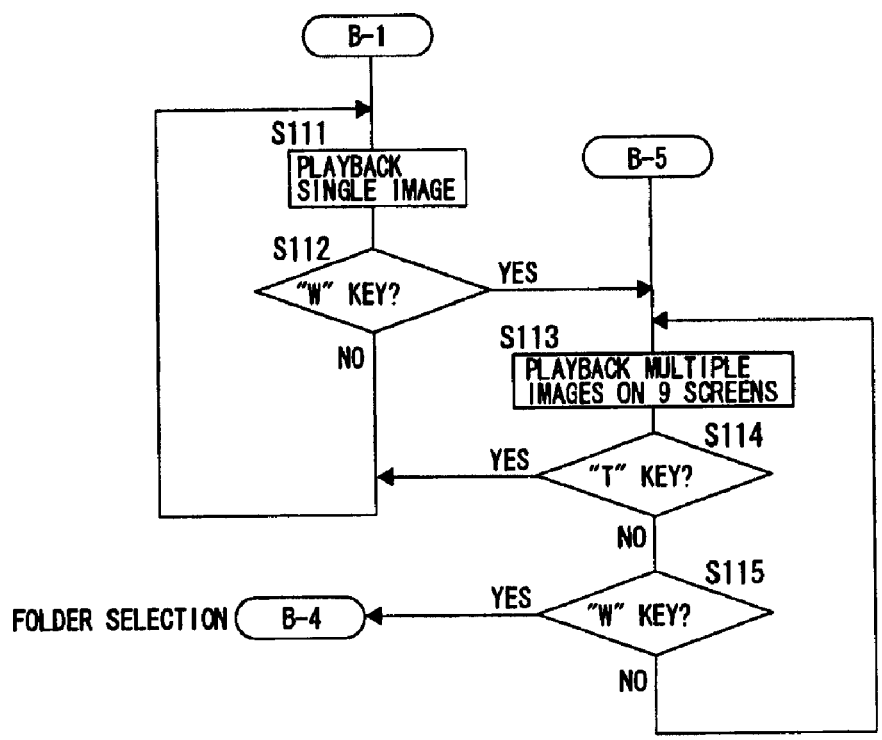
FIG. 10 is a flow chart for explaining a roll playback procedure in the playback mode.
Figure 11:
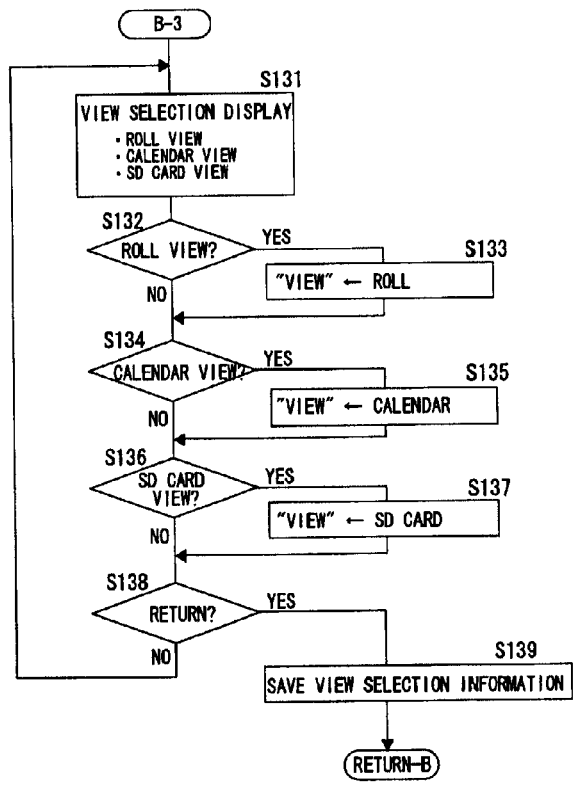
FIG. 11 is a flow chart for explaining a view selection procedure in the playback mode.
Figure 12:
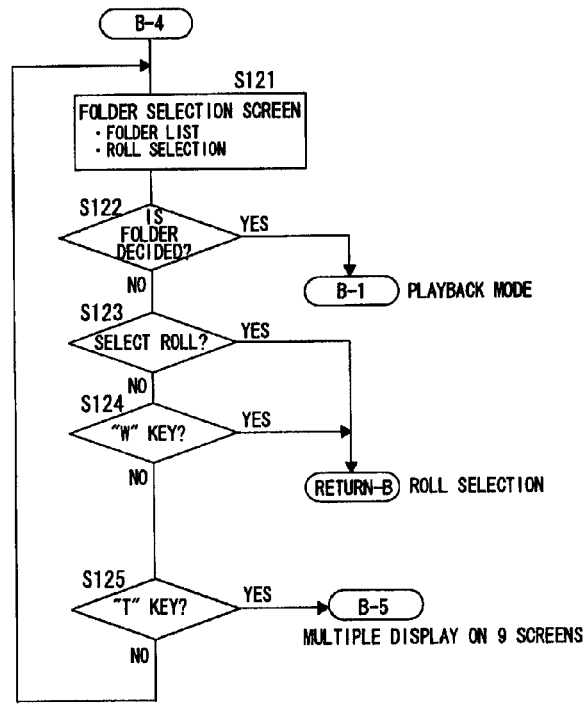
FIG. 12 is a flow chart for explaining a folder selection procedure in the playback mode.
Figure 13:
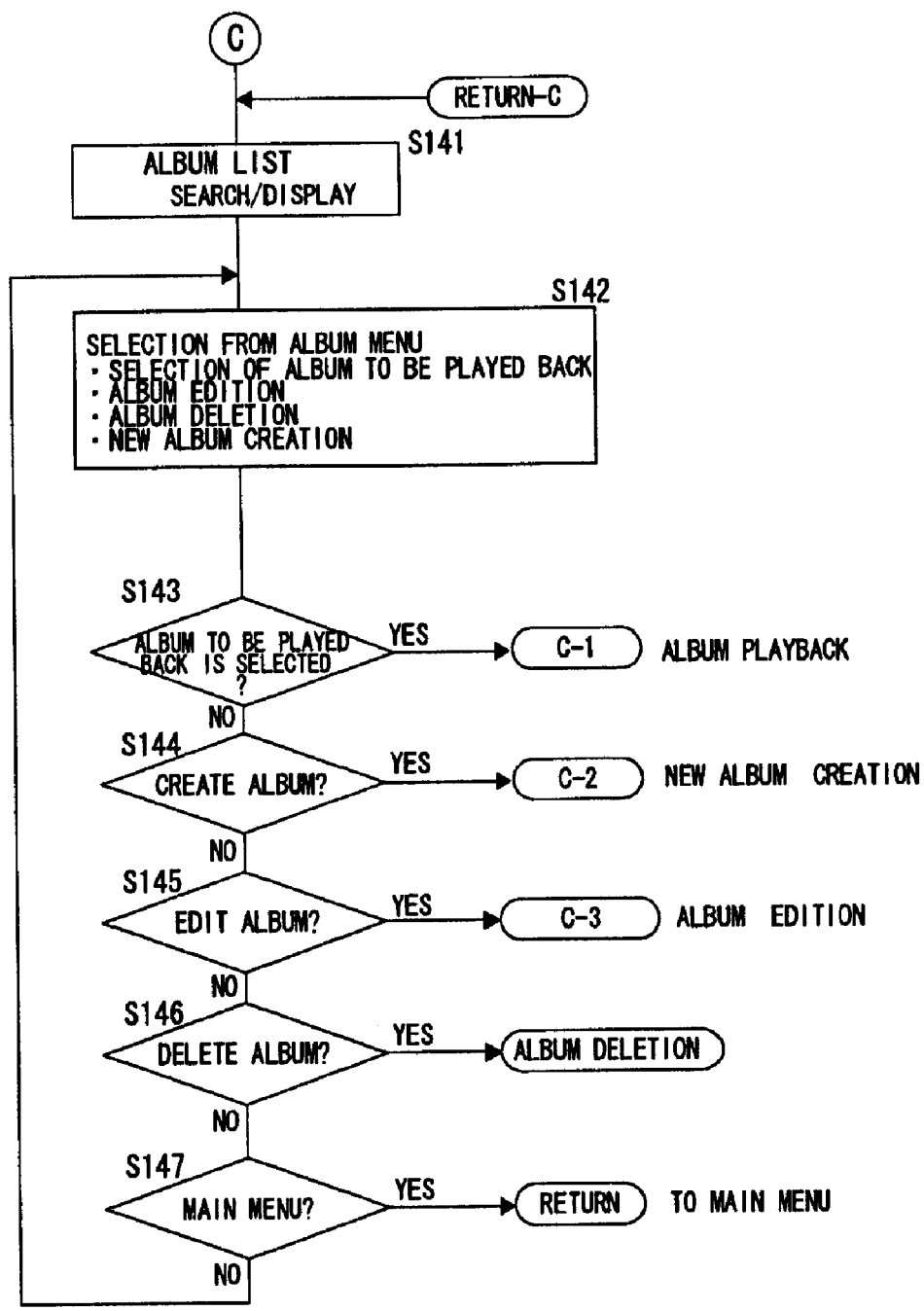
FIG. 13 is a flow chart for explaining a processing flow in an album mode.
Figure 14:
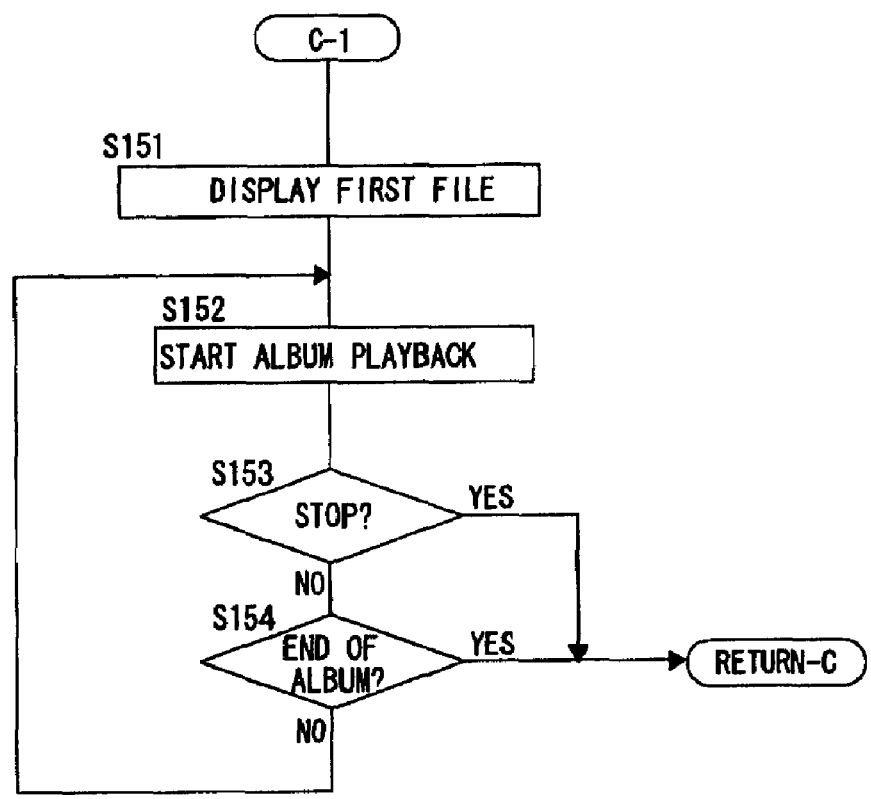
FIG. 14 is a flow chart for explaining an album playback procedure in the album mode.
Figure 15:
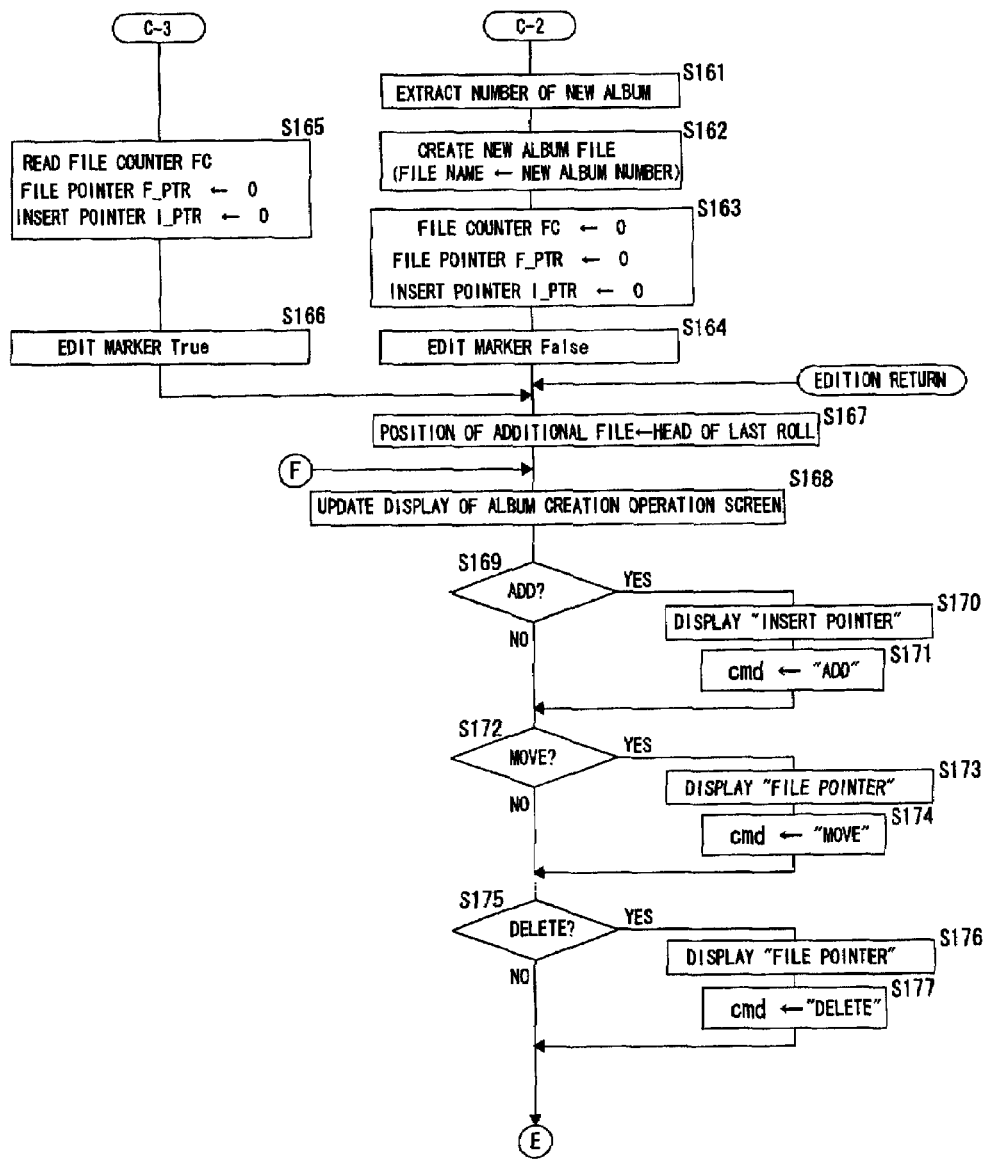
FIG. 15 is a flow chart for explaining the first halves of a new album creation procedure and an album edition procedure in the album mode.
Figure 16:
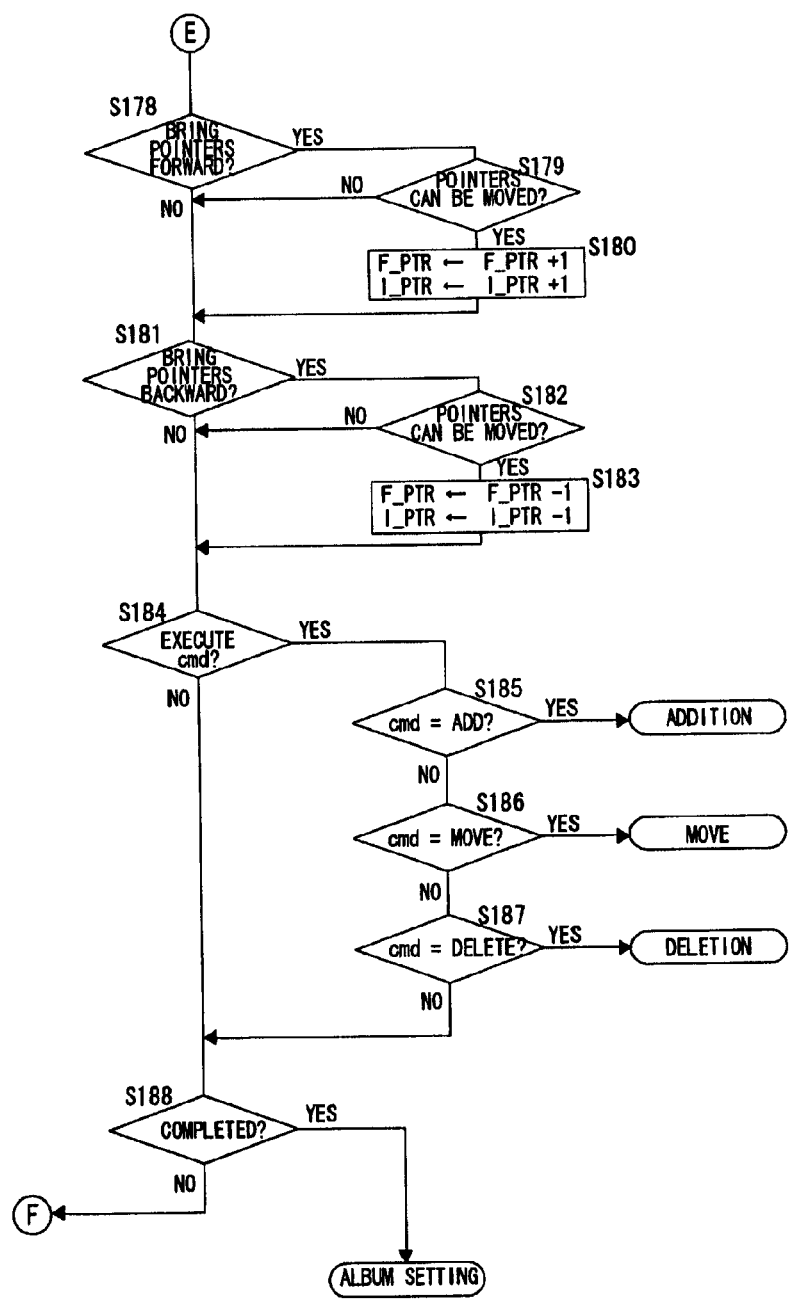
FIG. 16 is a flow chart for explaining the latter halves of the new album creation procedure and the album edition procedure in the album mode.
Figure 17:
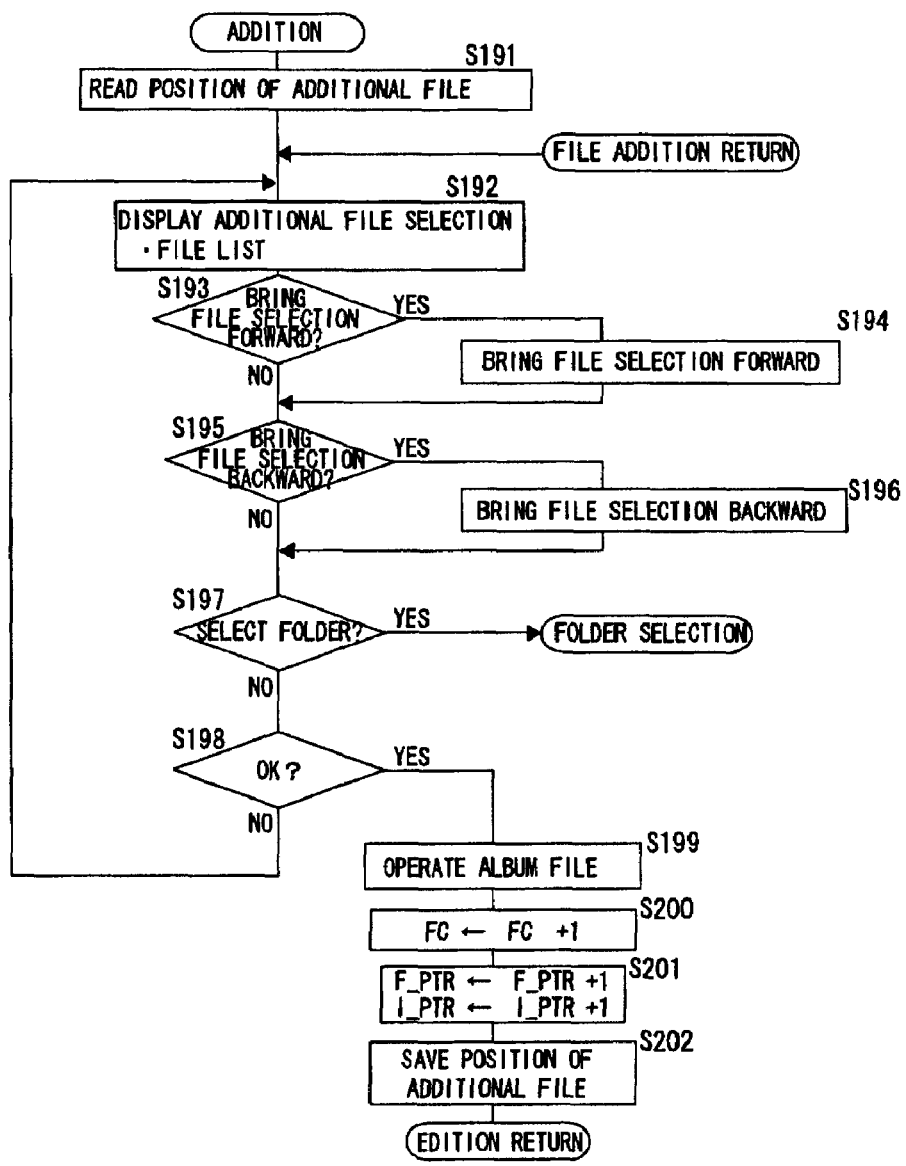
FIG. 17 is a flow chart for explaining a file addition procedure.
Figure 18:
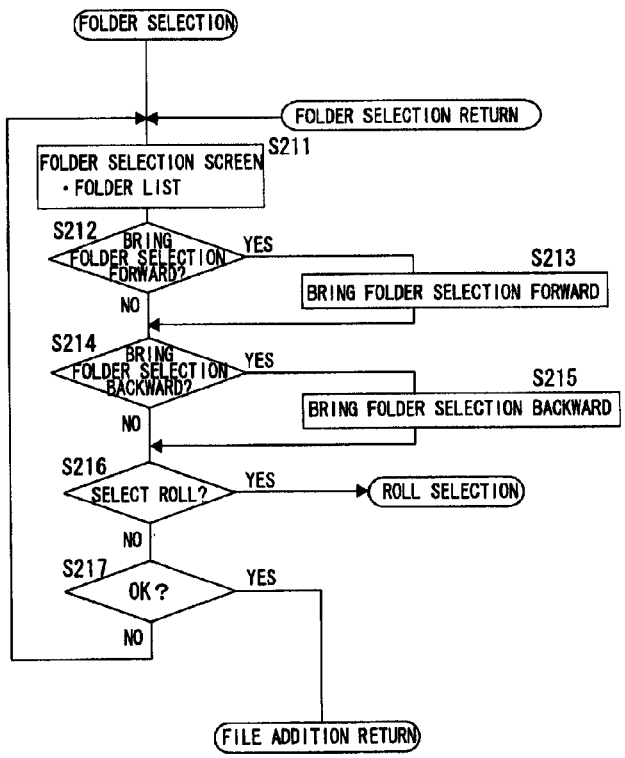
FIG. 18 is a flow chart for explaining a folder selection procedure.
Figure 19:
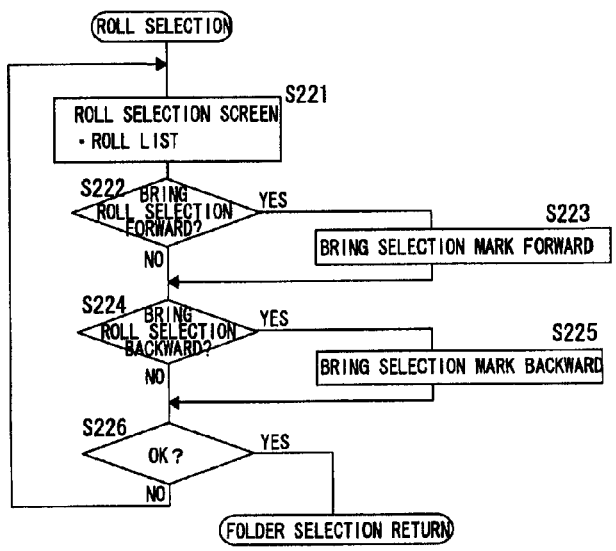
FIG. 19 is a flow chart for explaining a roll selection procedure.
Figure 20:
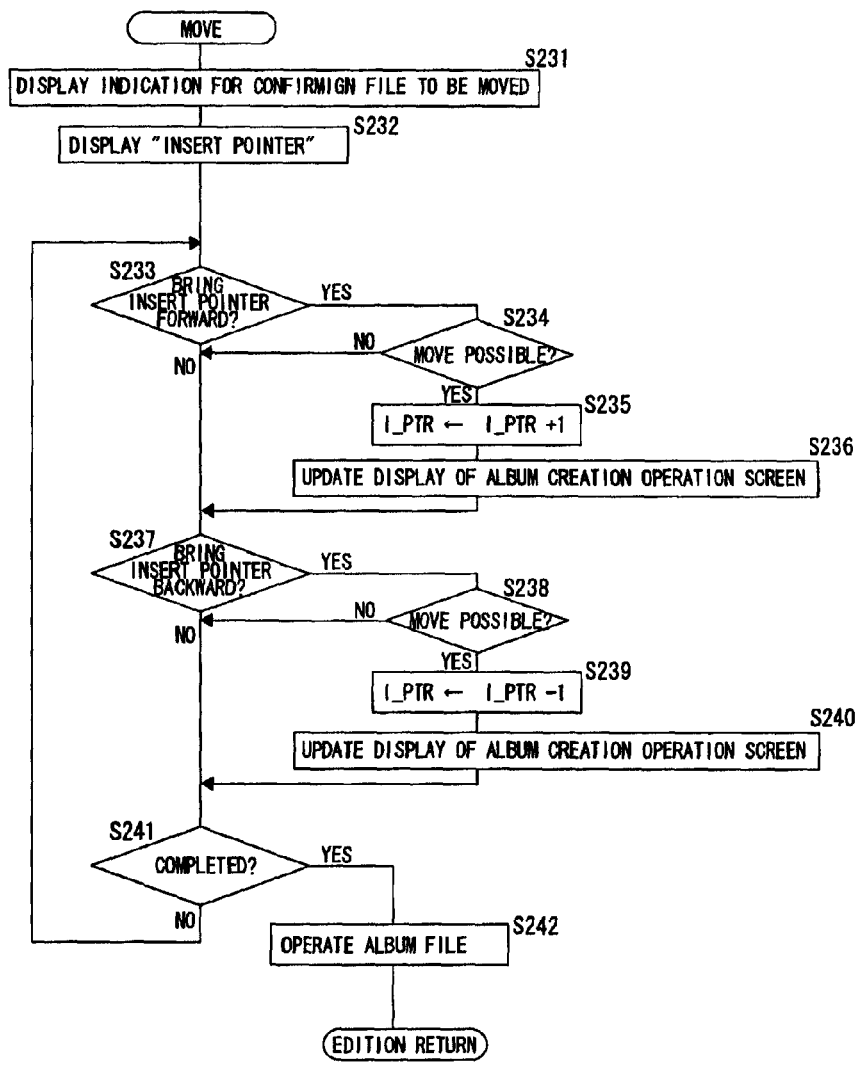
FIG. 20 is a flow chart for explaining a file move procedure.
Figure 21:
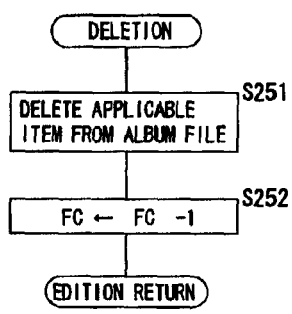
FIG. 21 is a flow chart for explaining a file deletion procedure.
Figure 22:
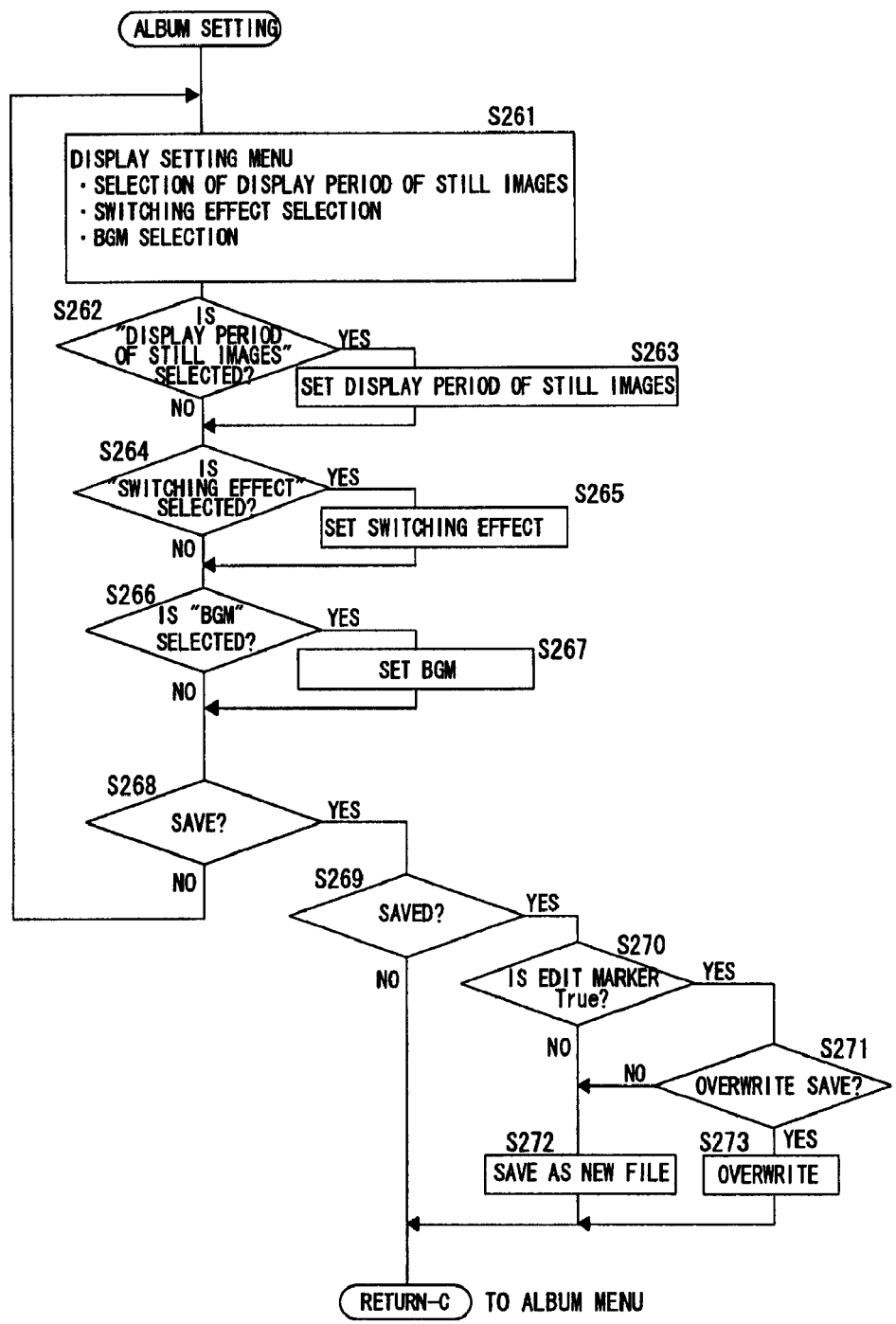
FIG. 22 is a flow chart for explaining an album setting procedure.
Figure 23:
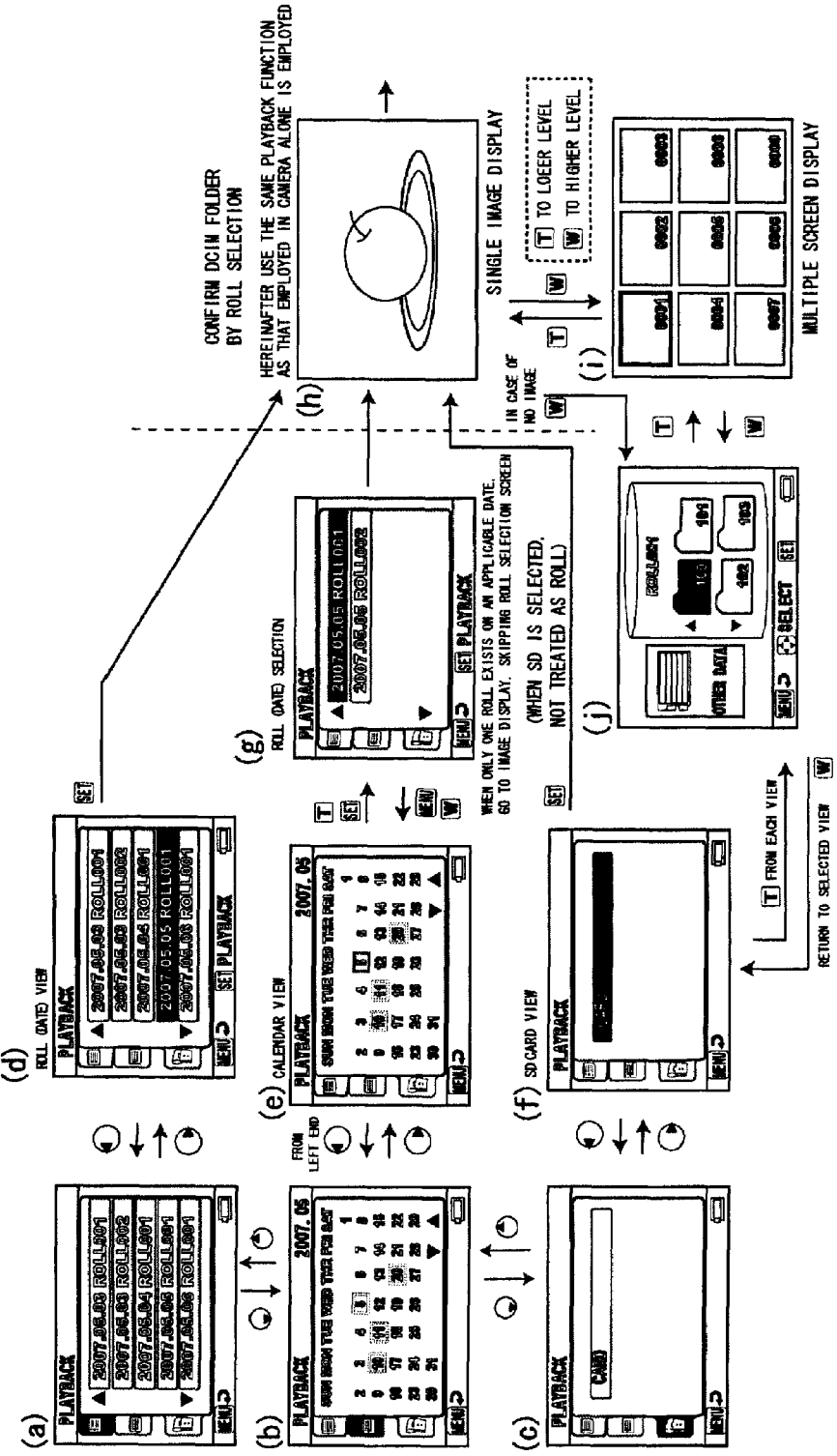
FIG. 23 shows transitions of display screens in the playback mode.
Figure 24:
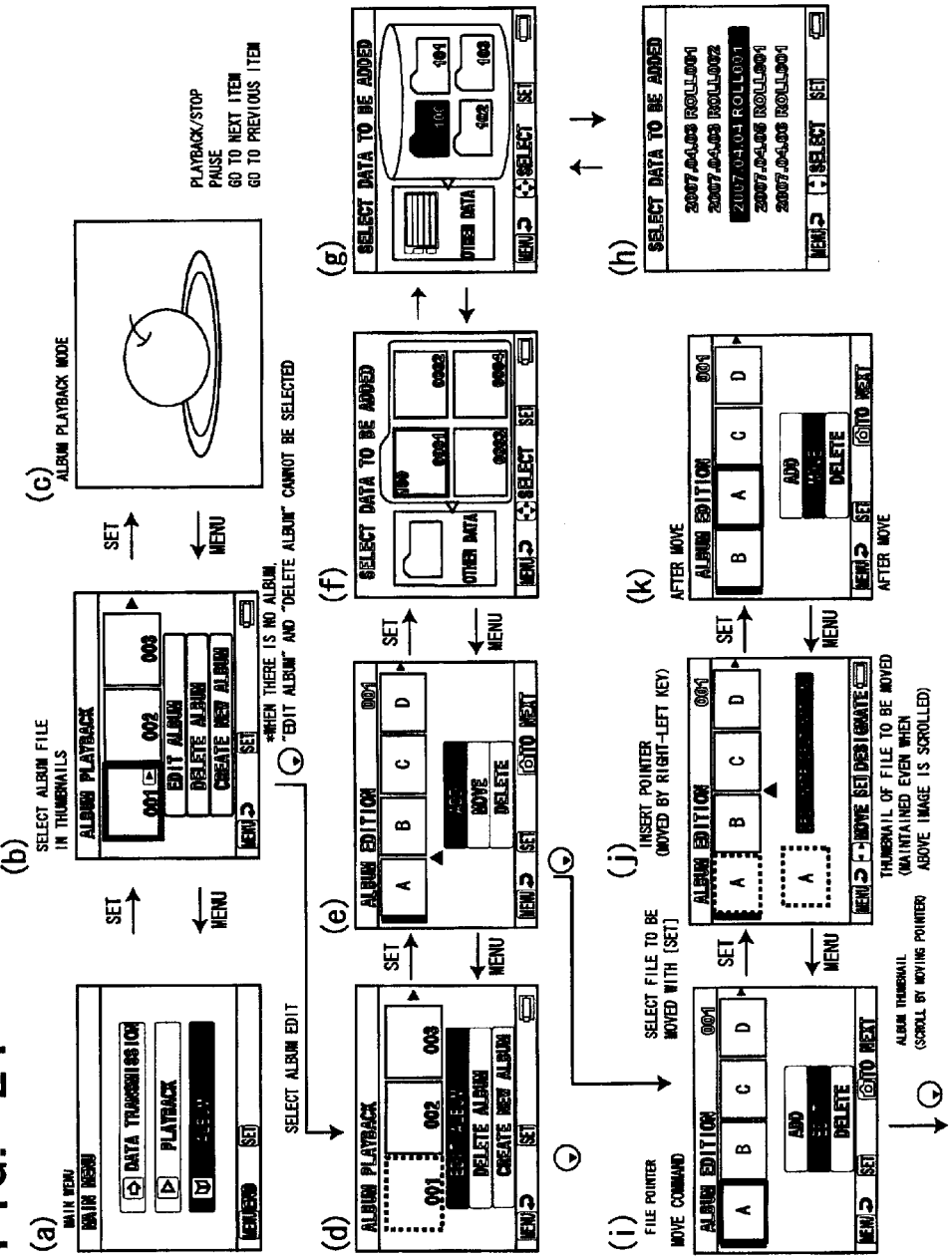
FIG. 24 shows transitions of display screens in the album mode.
Figure 25:
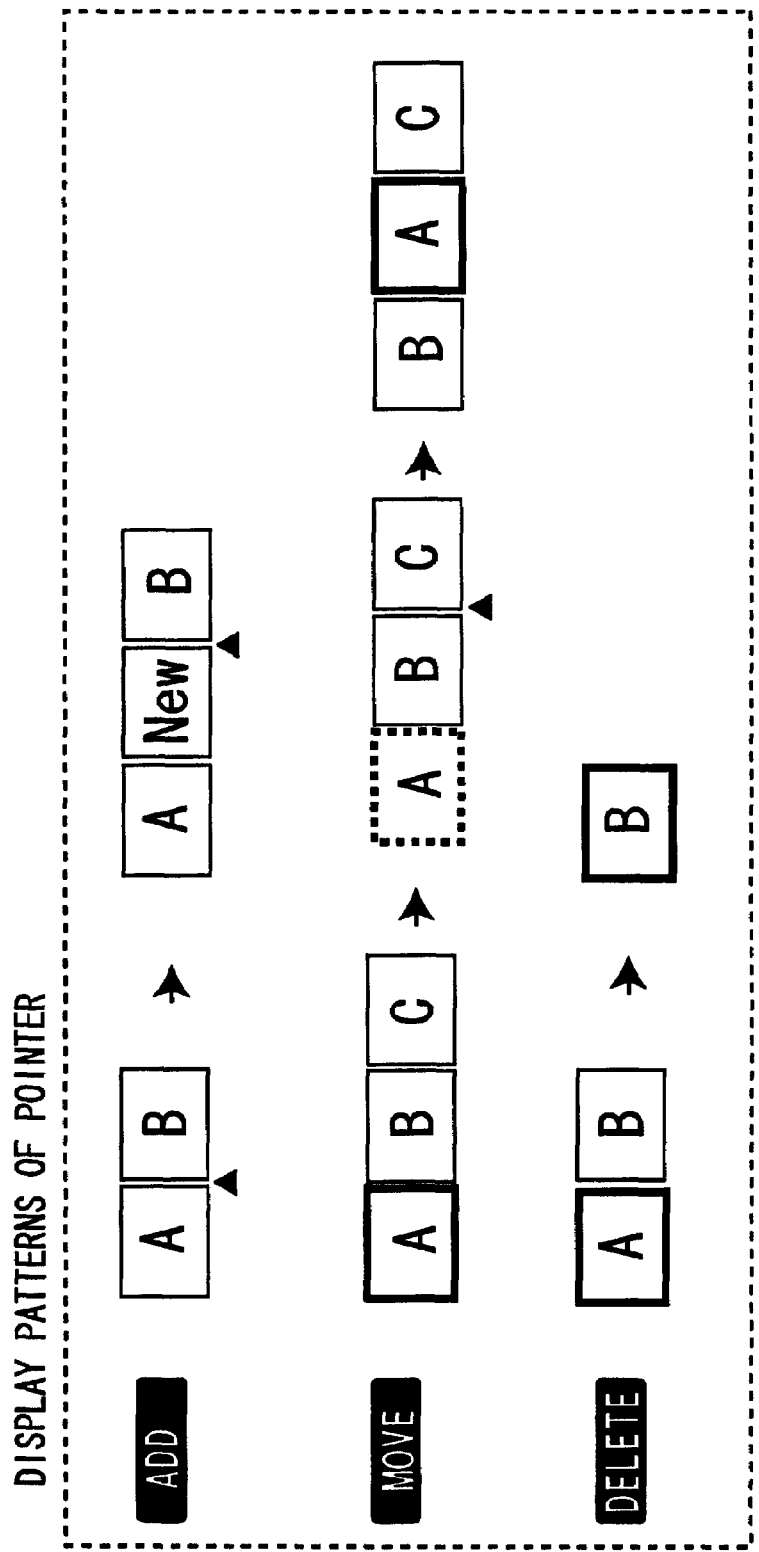
FIG. 25 shows the display patterns of pointers used in addition, move and deletion of a file.
Figure 26:
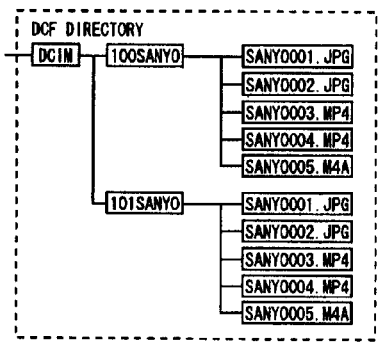
FIG. 26 shows a directory structure formed in an external memory card.
Figure 27:
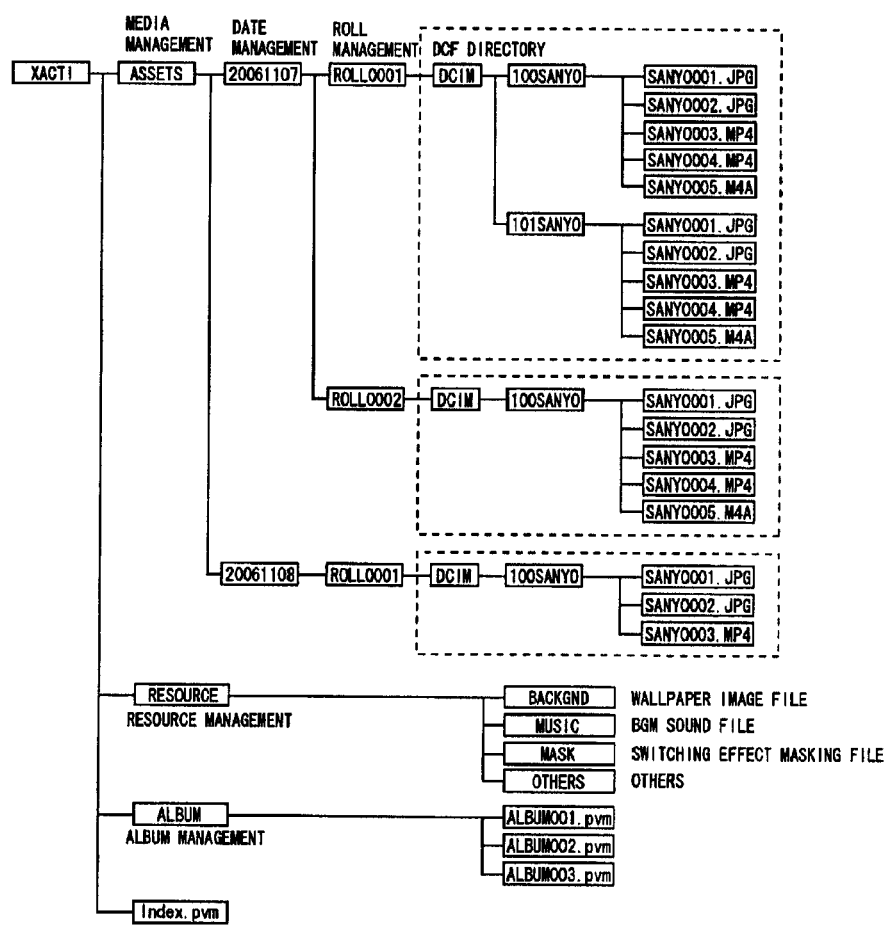
FIG. 27 shows a directory structure formed in an external hard disk drive.
Figure 28:
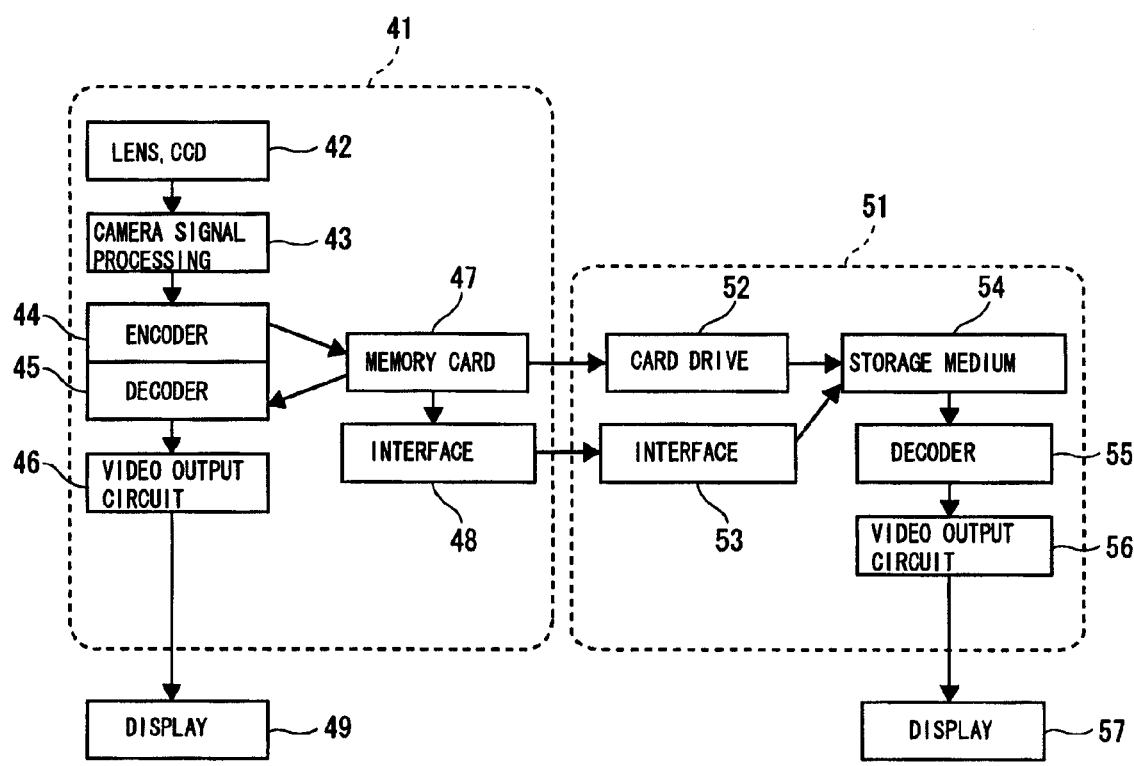
FIG. 28 is a block diagram showing the conventional structures of a camera body and a storage device.

EXPLANATION OF REFERENCES 1 camera body
14 memory controller
15 card drive
16 external memory card
17 USB interface
18 USB device controller
19 USB host controller
31 CPU
33 bus
2 cradle
27 USB device connector
28 USB host connector
29 AV connector
3 external hard disk drive
4 monitor television receiver
5 speaker

The invention claimed is:

1. An image capture device which has an image capture function and in which a memory is provided, the image capture device comprising:
 a first signal processing unit creating an image file by encoding image data obtained by image shooting;
 a second signal processing unit creating image data by decoding the image file created by the first signal processing unit;
 a memory controller writing the image file obtained from the first signal processing unit into said memory, or to read an image file from said memory;
 an output unit outputting the image data obtained from the second signal processing unit;
 an interface making connection to an external storage device, the external storage device having a capacity larger than that of said memory;
 a host controller controlling transmission and receipt of data through the interface; and
 a main control unit controlling operations of said memory controller and the host controller in order to transmit data between said memory and the external storage device,
 wherein a directory structure in said external storage device contains a directory structure that is the same as in said memory as a directory section in its lowest level, and
 wherein, with the directory structure in said memory arranged as a directory section in the lowest level, the directory structure in said external storage device contains a roll management directory which is arranged in a level higher than that of the directory section, and which manages the directory section as a unit roll, and a date management directory which is arranged in a level higher than that of the roll management directory, and which manages the date of each roll.

2. The image capture device according to claim 1, wherein said memory is an external memory that can be attached to and detached from a main body of said image capture device.

3. The image capture device according to claim 1, wherein said main control unit includes a directory structure scaling up unit scaling a directory structure in said memory up to a directory structure in said external storage device when a file written in the memory is transmitted to the external storage device.

4. The image capture device according to claim 1, wherein said main control unit includes a directory structure scaling down unit scaling a directory structure in said external storage device down to a directory structure in said memory when a file stored in the external storage device is written back to the memory.

5. The image capture device according to claim 1, wherein said main control unit has an image playback function for reading an image file from said external storage device, and supplying the image file through said interface to said second signal processing unit.

6. An image capture device which has an image capture function and in which a memory is provided, the image capture device comprising:
 a first signal processing unit creating an image file by encoding image data obtained by image shooting;
 a second signal processing unit creating image data by decoding the image file created by the first signal processing unit;
 a memory controller writing the image file obtained from the first signal processing unit into said memory, or to read an image file from said memory;
 an output unit outputting the image data obtained from the second signal processing unit;
 an interface making connection to an external storage device, the external storage device having a capacity larger than that of said memory;
 a host controller controlling transmission and receipt of data through the interface; and
 a main control unit controlling operations of said memory controller and the host controller in order to transmit data between said memory and the external storage device,
 wherein, in a playback mode for reading one image file from said external storage device and playing back the image file, said main control unit displays a selection screen for urging a user to perform a selecting operation at each intermediate level while sequentially making transitions from a higher level to a lower level of the directory structure in the external storage device, thereby allowing a particular image file selected by the user to be ultimately played back, the main control unit also making a direct transition from the higher level to the lower level without displaying a selection screen of an intermediate level, thereby allowing a predetermined image file to be played back.

7. An image capture device which has an image capture function and in which a memory is provided, the image capture device comprising:
 a first signal processing unit creating an image file by encoding image by image shooting;

a second signal processing unit creating image data by decoding the image file created by the first signal processing unit;

a memory controller writing the image file obtained from the first signal processing unit into said memory, or to read an image file from said memory;

an output unit outputting the image data obtained from the second signal processing unit;

an interface making connection to an external storage device, the external storage device having a capacity larger than that of said memory;

a host controller controlling transmission and receipt of data through the interface; and a main control unit controlling operations of said memory controller and the host controller in order to transmit data between said memory and the external storage device, wherein, in an album mode for playing back a plurality of images in a predetermined order, said main control unit displays, when a new file is added to an already existing sequence of files, an insert pointer indicating the insertion position of the new file on a screen, the main control unit also displaying, when a file belonging to an already existing sequence of files is moved to another position, a file pointer indicating the file to be moved on a screen while displaying an insert pointer indicating the destination of the file on the screen.

8. An image capture system comprising:

a main body which has an image capture function and in which a memory is provided, and an external storage device connected to the main body, the external storage device having a capacity larger than that of said memory, said main body including:

a first signal processing unit creating an image file by encoding image data obtained by image shooting;

a second signal processing unit creating image data by decoding the image file created by the first signal processing unit;

a memory controller writing the image file obtained from the first signal processing unit into said memory, or to read an image file from said memory;

an output unit outputting the image data obtained from the second signal processing unit;

an interface making connection to said external storage device;

a host controller controlling transmission and receipt of data through the interface; and a main control unit having an image transmission function for transmitting an image file written in said memory to said external storage device by controlling the operations of said memory controller and the host controller, wherein a directory structure in said external storage device contains a directory structure that is the same as in said memory as a directory section in its lowest level, and wherein, with the directory structure in said memory arranged as a directory section in the lowest level, the directory structure in said external storage device contains a roll management directory which is arranged in a level higher than that of the directory section, and which manages the directory section as a unit roll, and a date management directory which is arranged in a level higher than that of the roll management directory, and which manages the date of each roll.

* * * * *